US012749230B2

(12) United States Patent
Mishin Shuvi et al.

(10) Patent No.: US 12,749,230 B2
(45) **Date of Patent: *Sep. 29, 2026**

(54) VIRTUAL CLOTHING TRY-ON

(71) Applicant: Snap Inc., Santa Monica, CA (US)

(72) Inventors: Ma'ayan Mishin Shuvi, Givatayim (IL); Avihay Assouline, Tel Aviv (IL); Itamar Berger, Hod Hasharon (IL)

(73) Assignee: Snap Inc., Santa Monica, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 18/499,166

(22) Filed: Oct. 31, 2023

(65) Prior Publication Data

US 2024/0062444 A1 Feb. 22, 2024

Related U.S. Application Data

(63) Continuation of application No. 18/145,718, filed on Dec. 22, 2022, now Pat. No. 11,830,118, which is a (Continued)

(51) Int. Cl.

*G06T 11/60* (2026.01)
*G06N 3/04* (2023.01)

(Continued)

(52) U.S. Cl.

CPC ................ *G06T 11/60* (2013.01); *G06N 3/04* (2013.01); *G06N 3/08* (2013.01); *G06T 3/18* (2024.01);

(Continued)

(58) Field of Classification Search

None

See application file for complete search history.

(56) References Cited

U.S. PATENT DOCUMENTS

| | | | |
|---|---|---|---|
| 7,308,332 | B2 | 12/2007 | Okada et al. |
| 7,327,860 | B2 | 2/2008 | Derakhshani et al. |

(Continued)

FOREIGN PATENT DOCUMENTS

| | | |
|---|---|---|
| CN | 111275518 | 6/2020 |
| CN | 111325693 A | 6/2020 |
| KR | 102906024 B1 | 12/2025 |
| WO | WO-2022125167 | 6/2022 |

OTHER PUBLICATIONS

Avots, Egils, et al. "From 2D to 3D geodesic-based garment matching." Multimedia Tools and Applications 78.18 (2019): 25829-25853 (Year: 2019).*

(Continued)

*Primary Examiner* — Sarah Le
(74) *Attorney, Agent, or Firm* — Schwegman Lundberg & Woessner, P.A.

(57) ABSTRACT

A messaging system performs virtual clothing try-on. A method of virtual clothing try-on may include accessing a target garment image and a person image of a person wearing a source garment and processing the person image to generate a source garment mask and a person mask. The method may further include processing the source garment mask, the person mask, the target garment image, and a target garment mask to generate a warping, the warping indicating a warping to apply to the target garment image. The method may further include processing the target garment to warp the target garment in accordance with the warping to generate a warped target garment image, processing the warped target garment image to blend with the person image to generate a person with a blended target garment image, and processing the person with blended target garment image to fill in holes to generate an output image.

20 Claims, 26 Drawing Sheets

Related U.S. Application Data continuation of application No. 17/119,202, filed on Dec. 11, 2020, now Pat. No. 11,544,884.

(51) Int. Cl.

| | |
|---|---|
| ***G06N 3/08*** | (2023.01) |
| ***G06T 3/18*** | (2024.01) |
| ***G06T 5/40*** | (2006.01) |
| ***G06T 5/50*** | (2006.01) |
| ***G06T 7/11*** | (2017.01) |
| ***G06T 11/10*** | (2026.01) |
| *H04L 51/046* | (2022.01) |

(52) U.S. Cl.

CPC .................. *G06T 5/40* (2013.01); *G06T 5/50* (2013.01); *G06T 7/11* (2017.01); *G06T 11/10* (2026.01); *G06T 2207/20081* (2013.01); *G06T 2207/20084* (2013.01); *G06T 2207/20221* (2013.01); *G06T 2207/20224* (2013.01); *G06T 2207/30196* (2013.01); *G06T 2210/16* (2013.01); *H04L 51/046* (2013.01)

(56) References Cited

U.S. PATENT DOCUMENTS

| | | | | |
|---|---|---|---|---|
| 7,840,066 | B1 | 11/2010 | Chen et al. | |
| 8,401,276 | B1 | 3/2013 | Choe et al. | |
| 9,160,936 | B1 | 10/2015 | Rivard et al. | |
| 10,304,227 | B2 | 5/2019 | Colbert | |
| 11,544,884 | B2 | 1/2023 | Shuvi et al. | |
| 2014/0010449 | A1 | 1/2014 | Haaramo et al. | |
| 2016/0292779 | A1 | 10/2016 | Rose et al. | |
| 2019/0066733 | A1 | 2/2019 | Somanath et al. | |
| 2019/0130649 | A1 | 5/2019 | O'Brien et al. | |
| 2020/0066029 | A1 | 2/2020 | Chen et al. | |
| 2020/0151807 | A1 | 5/2020 | Zhou et al. | |
| 2020/0349772 | A1 | 11/2020 | Tkach et al. | |
| 2021/0065418 | A1* | 3/2021 | Han ........................ | G06T 11/60 |
| 2021/0090209 | A1 | 3/2021 | Appleboim et al. | |
| 2021/0133919 | A1* | 5/2021 | Ayush ..................... | G06T 11/60 |
| 2021/0287274 | A1 | 9/2021 | Nguyen et al. | |
| 2022/0189087 | A1 | 6/2022 | Shuvi et al. | |
| 2023/0129747 | A1 | 4/2023 | Mishin Shuvi et al. | |

OTHER PUBLICATIONS

Dong, Haoye, et al. "Fw-gan: Flow-navigated warping gan for video virtual try-on." Proceedings of the IEEE/CVF international conference on computer vision. 2019. (Year: 2019).*

"Adaptive histogram equalization", Wikipedia, [Online] Retrieved from the Internet: <URL: https://en.wikipedia.org/w/index.php?title=AdaptiveJiistogram_equalization&oldid=594245673>, [Retrieved on Jun. 15, 2018], (Feb. 6, 2014), 4 pgs.

"U.S. Appl. No. 17/119,202, Non Final Office Action mailed Mar. 25, 2022", 16 pgs.

"U.S. Appl. No. 17/119,202, Notice of Allowance mailed Aug. 30, 2022", 9 pgs.

"U.S. Appl. No. 17/119,202, Response filed Jun. 24, 2022 to Non Final Office Action mailed Mar. 25, 2022", 9 pgs.

"U.S. Appl. No. 18/145,718, Non Final Office Action mailed May 22, 2023", 9 pgs.

"U.S. Appl. No. 18/145,718, Notice of Allowance mailed Jul. 19, 2023", 10 pgs.

"U.S. Appl. No. 18/145,718, Response filed Jul. 3, 2023 to Non Final Office Action mailed May 22, 2023", 7 pgs.

"International Application Serial No. PCT/US2021/051940, International Preliminary Report on Patentability mailed Jun. 22, 2023", 10 pgs.

"International Application Serial No. PCT/US2021/051940, International Search Report mailed Jan. 7, 2022", 4 pgs.

"International Application Serial No. PCT/US2021/051940, Written Opinion mailed Jan. 7, 2022", 8 pgs.

Bochao, Wang, et al., "Toward Characteristic-Preserving Image-Based Virtual Try-On Network", Advances in Biometrics : International Conference, ICB 2007, Seoul, Korea, Aug. 27-29, 2007 ; Proceedings; [Lecture Notes in Computer Science; Lect.Notes Computer], Springer, Berlin, Heidelberg, (Oct. 6, 2018), 607-623.

Cushen, George A, et al., "Markerless real-time garment retexturing from monocular 3D reconstruction", 2011 IEEE International Conference on Signal and Image Processing Applications (ICSIPA), (Nov. 16, 2011), 88-93.

Han, Xintong, et al., "VITON: An Image-Based Virtual Try-on Network", 2018 IEEE/CVF Conference on Computer Vision and Pattern Recognition, (Jun. 18, 2018), 7543-7552.

Yu, Li, et al., "Inpainting-Based Virtual Try-on Network for Selective Garment Transfer", IEEE Access, vol. 7, (Sep. 13, 2019), 134125-134136.

"Korean Application Serial No. 10-2023-7022825, Notice of Preliminary Rejection mailed Jan. 16, 2025", w/ English translation, 18 pgs.

"Korean Application Serial No. 10-2023-7022825, Response filed Mar. 17, 2025 to Notice of Preliminary Rejection mailed Jan. 16, 2025", w/ English claims, 27 pgs.

"European Application Serial No. 21801287.0, Communication Pursuant to Article 94(3) EPC mailed Jul. 24, 2025", 5 pgs.

George, A., et al.,"Marker less Real-Time Garment Retexturing from Monocular 3D Reconstruction", ICSIPA, (2011), 6 pgs.

"European Application Serial No. 21801287.0, Response to Communication Pursuant to Rules 161 and 162 EPC Filed Jan. 25, 2024", 16 pgs.

* cited by examiner

VIRTUAL CLOTHING TRY-ON

CLAIM OF PRIORITY

This application is a continuation of U.S. patent application Ser. No. 18/145,718, filed on Dec. 22, 2022, which is a continuation of U.S. patent application Ser. No. 17/119,202, filed on Dec. 11, 2020, which are incorporated herein by reference in their entireties.

TECHNICAL FIELD

Embodiments of the present disclosure relate generally to virtual clothing try-on using neural networks within messaging systems. More particularly, but not by way of limitation, embodiments of the present disclosure relate to processing an image of a person with source clothing and an image of target clothing and generating an image of the person with the target clothing using neural networks to process the images.

BACKGROUND

Enabling a person to virtual try-on clothing is complex because the images of the person and the target clothing may not match in size, shape, or lighting. Traditional computer graphic methods are very complex to implement and computationally demanding, which may make the applications too expensive to develop and which may make the applications too computationally demanding for mobile devices. Additionally, the traditional computer graphic methods have had difficulty in achieving images that are sufficiently realistic to enable a person to evaluate whether or not they would be interested in purchasing the clothing that they have virtually tried on.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
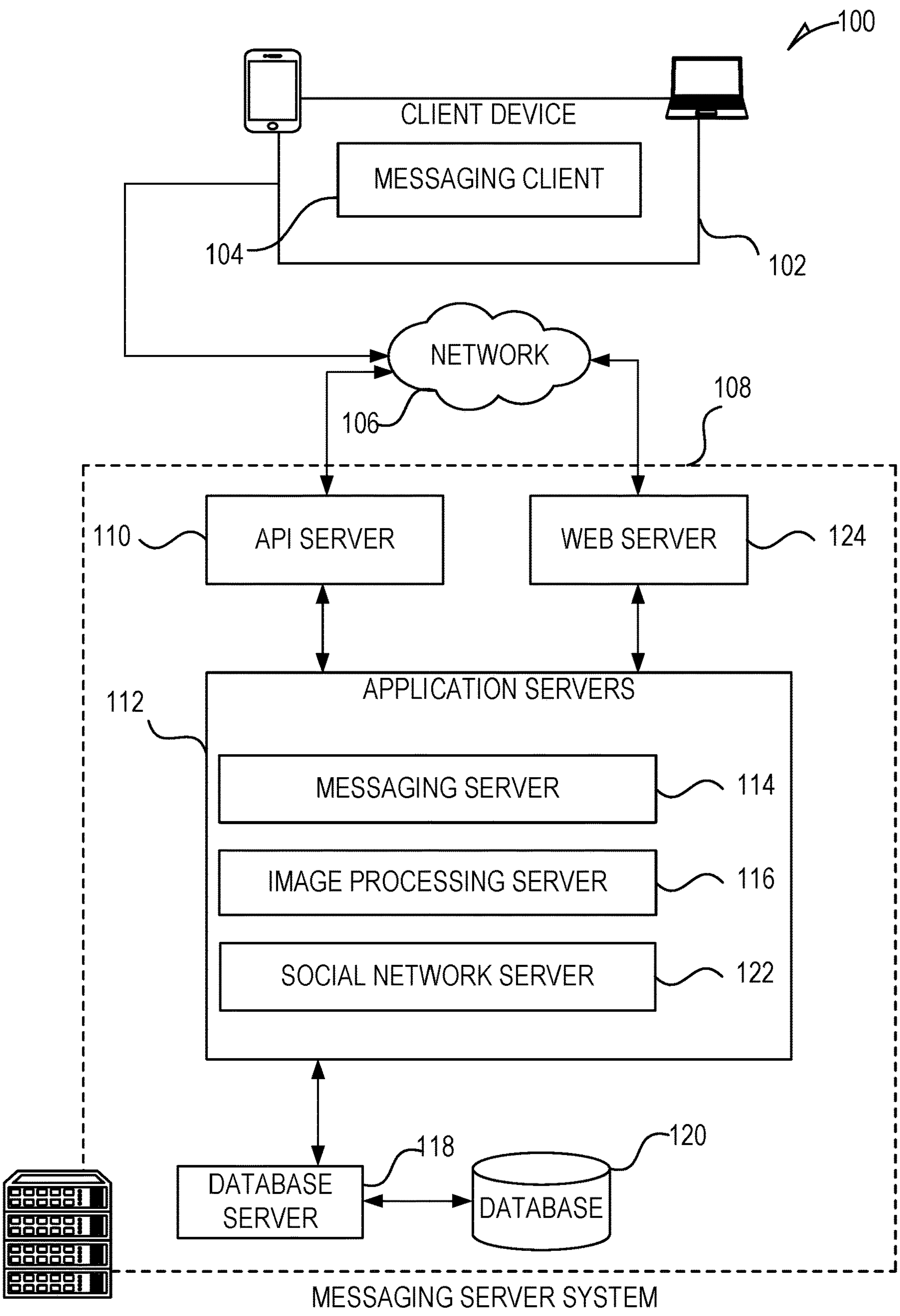
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Disclosed is a messaging system that includes virtual clothing try-on. The virtual clothing try-on system takes an image of clothing to try-on which may be downloaded from the internet such as from an online store and processes it along with an image of a person so that the person may evaluate how they would look in the clothing.

The virtual clothing try-on system utilizes several neural networks and may process the images in several phases. The virtual clothing try-on system may first determine how to warp the target clothing or clothing to try-on so that the target clothing may be shaped and sized in a similar manner as the source clothing in the image of the person. The target clothing is then warped and blended with the image of the person over the source clothing. The target clothing may have a white background so that the warped targeted clothing image merged with the image of the person will create holes or white spaces.

The virtual clothing try-on system will then fill-in the holes or white spaces. The virtual clothing try-on system will then harmonize the target clothing by using lighting from the source clothing so that the lighting of the target clothing more closely matching the lighting of the image of the person and looks more natural. The virtual clothing module will then determine a texture of the source clothing and overlay the texture on the target clothing so that the target clothing has a realistic texture for the image of the person.

The neural networks used for the virtual clothing try-on system may be trained end to end with a dataset that comprises an image of the person wearing the target clothing and a separate image of the target clothing in a standard position such as a flat lay which is often used for displaying clothing in online clothing stores.

A technical problem is how to achieve a high enough quality image so that a person can determine whether they are interested in purchasing clothing based on how they would look in the clothing. The virtual clothing try-on system achieves a high quality virtual try-on image by performing image processing in a series of stages as described above with multiple neural networks that are trained end-to-end with a ground truth.

A technical problem is how to train a neural network to fill-in white spaces after the target clothing has been blended with the image of the person. The virtual clothing try-on system performs training on a convolution neural network with a ground truth dataset with the losses determined between the output of the network and the ground truth input of the person. And where the losses are further determined by the difference between a holes mask and an output holes mask. The holes mask is determined by subtracting a mask of the target garment from a mask of the warped garment. The output holes mask is determined by subtracting a mask of the target garment from a mask of the target garment in the output image. Additionally, the input image is blended with the holes mask to create the holes. Training a neural network to fill-in white spaces creates more realistic output images where the portion of the image that is generated to cover the white space blends with the remainder of the output image more naturally.

Some embodiments generate a warp transformation between a target garment and a source garment extracted from the image of the person. The warp transformation is generated without explicitly determining a correspondence between the target garment and the garment worn by the target person. The task of the warp transformation is to warp the target garment such that it will be the same or similar to the garment extracted from the image of the person. The warp transformation is performed with a convolution neural network where supervised learning is used with a ground truth of images.

Some embodiments are turned to particular articles of clothing. For example, in one embodiment, the neural network are trained with a ground truth dataset of t-shirts.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
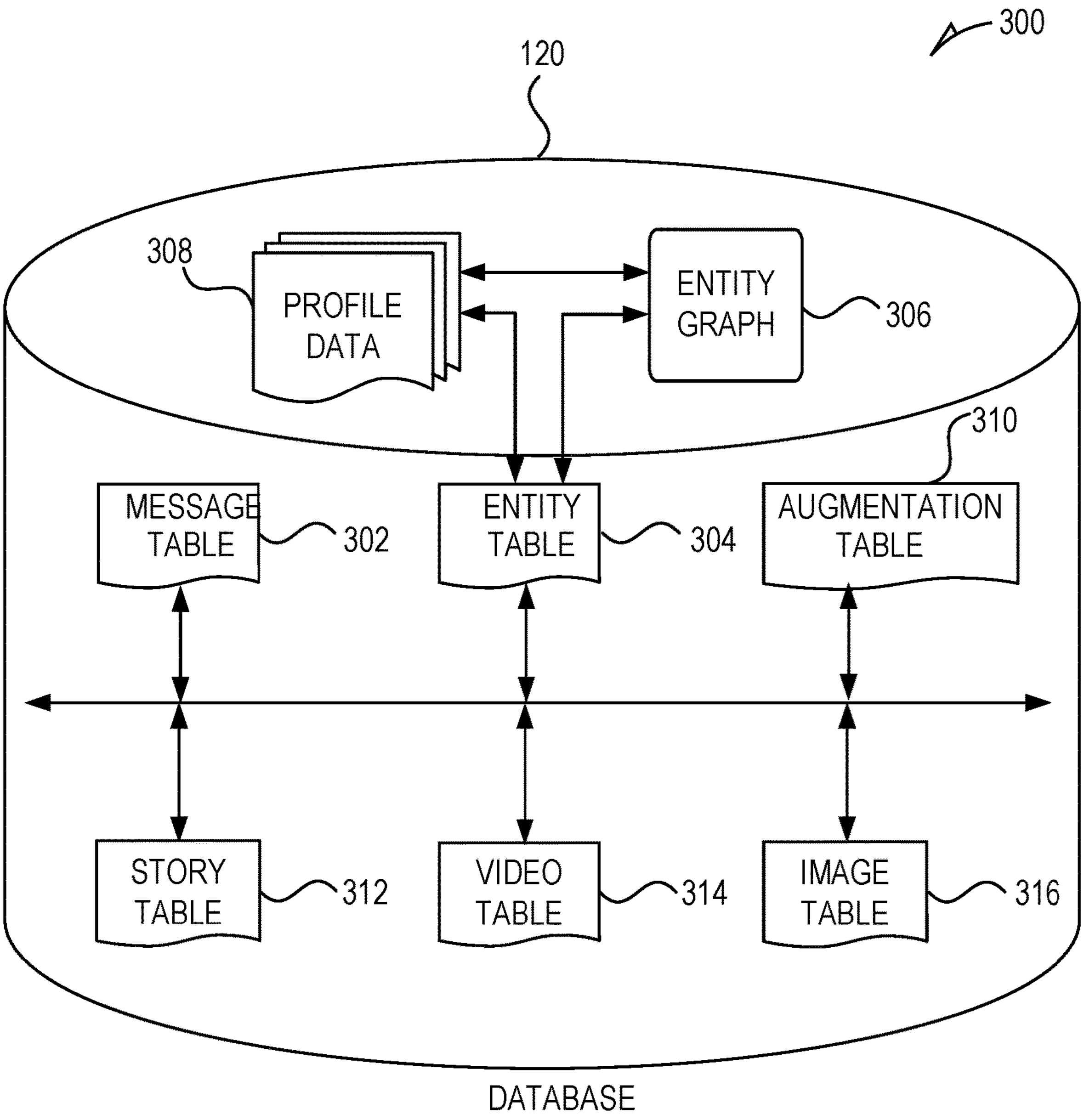
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
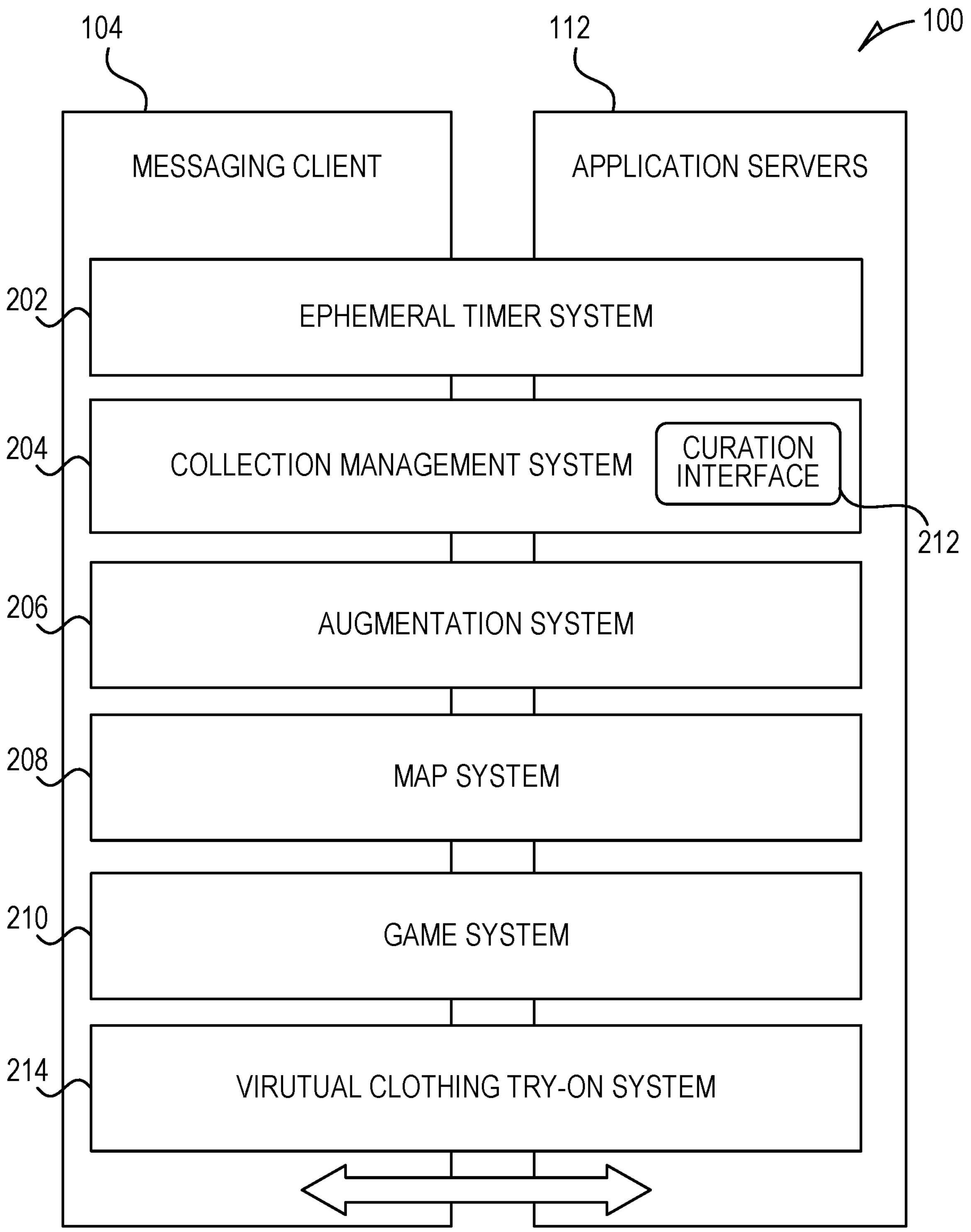
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, a modification system 206, a map system 208, a game system 210, and a neural hair rendering system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Figure 6:
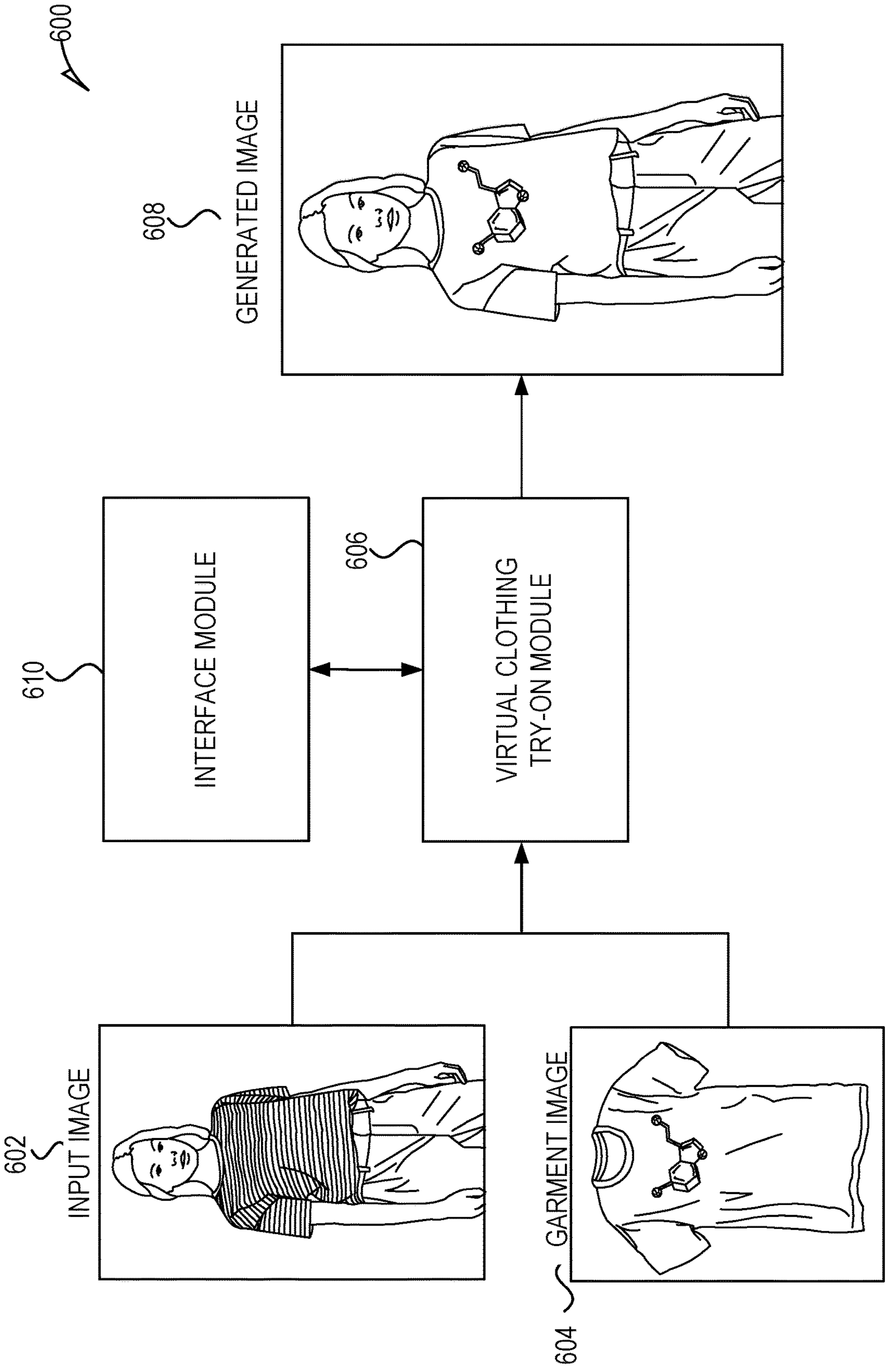
FIG. 6 illustrates the operation of a virtual clothing try-on module, in accordance with some embodiments.

The virtual clothing try-on system 214 provides various functions related to training neural networks 2206 and processing input image 602 and garment image 604 to generate generated image 608 of FIG. 6. The virtual clothing try-on system 214 may provide a means for user devices 102 to download trained neural networks 2206 for virtual clothing try-on as well as download user interfaces such as is described in conjunction with FIGS. 6-8 for using virtual clothing try-on. The virtual clothing try-on system 214 may provide access to a database of reference garment images 2006 for virtual try-on that may be remotely retrieved by the user device 102.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications.

This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Figure 20:
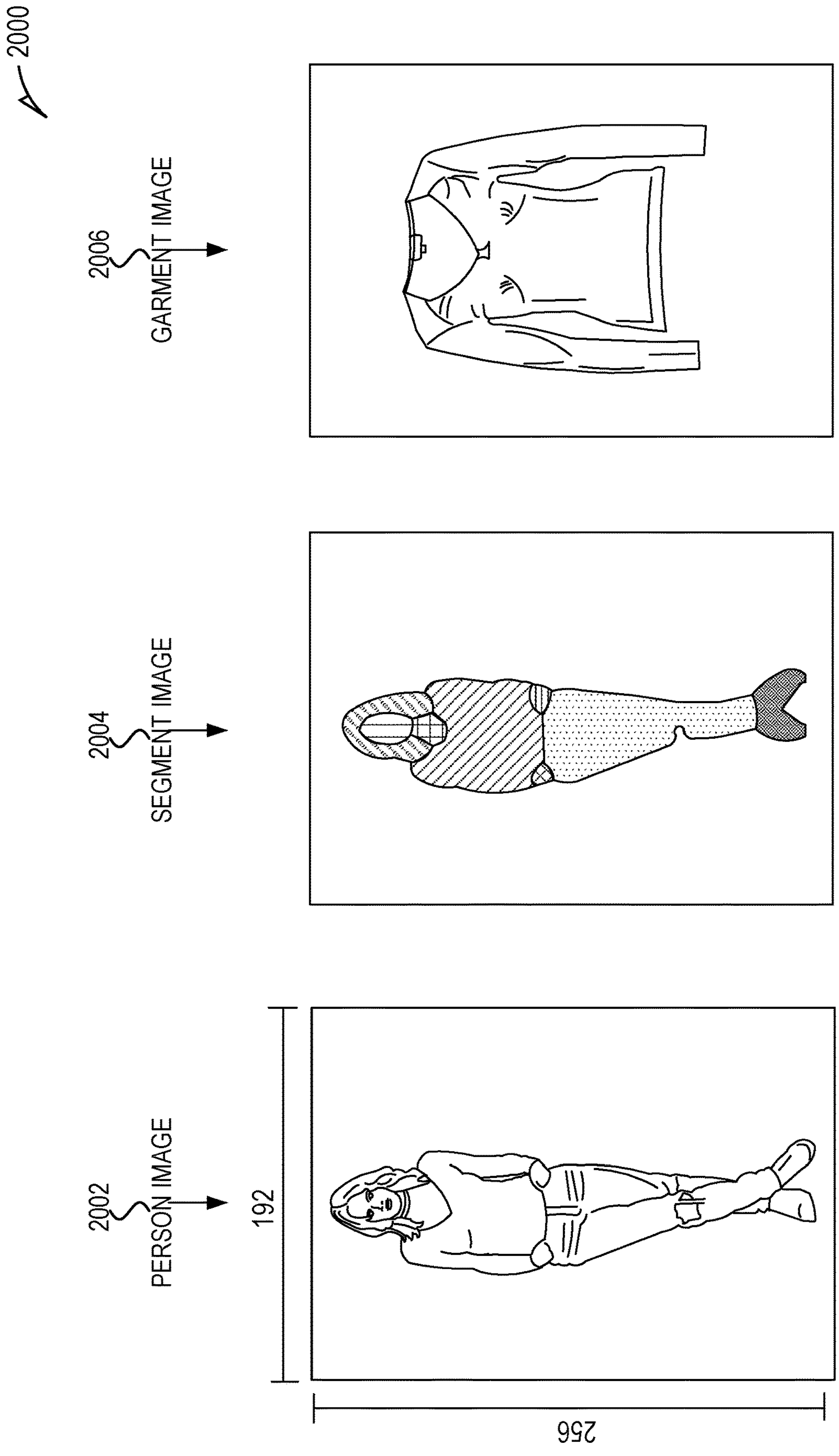
FIG. 20 illustrates elements of a dataset, in accordance with some embodiments.
Figure 22:
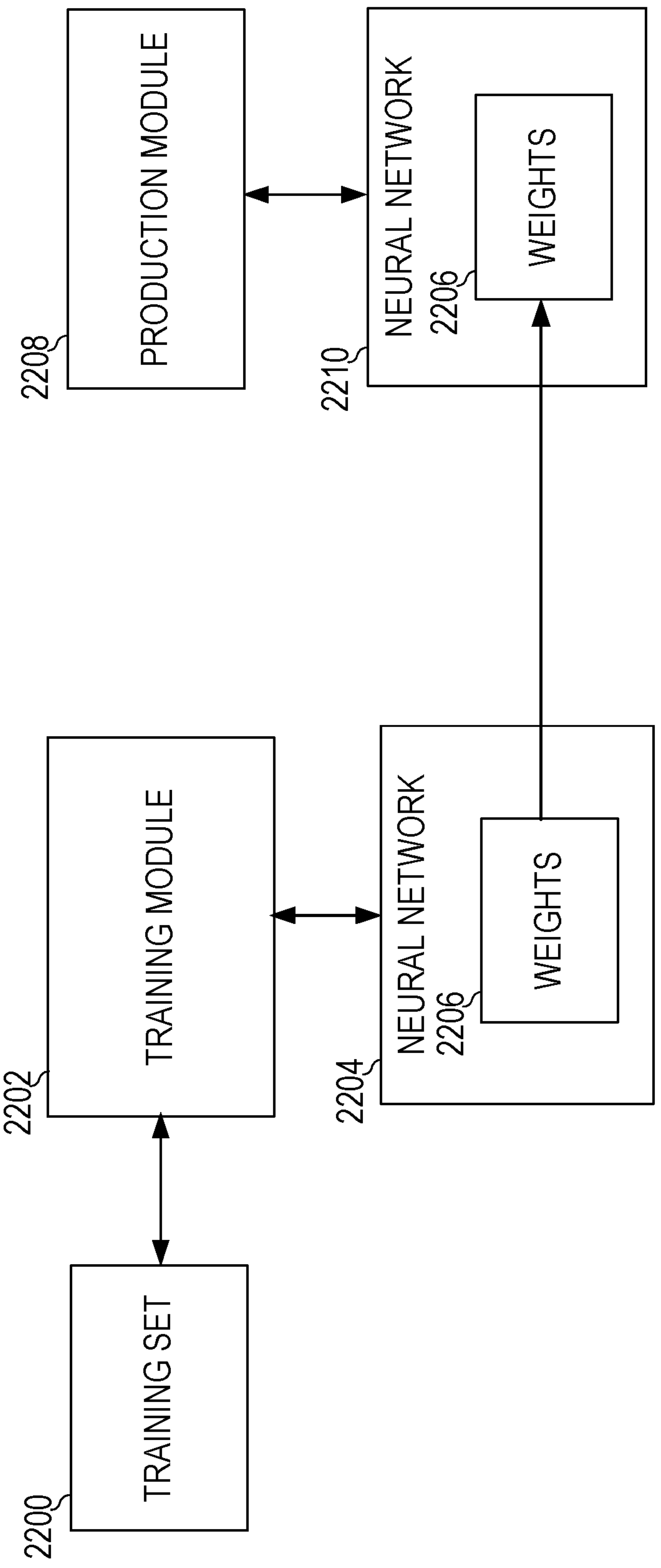
FIG. 22 illustrates the operation of training a neural network, in accordance with some embodiments.

The database 120 can also store, referring to FIGS. 20 and 22, the dataset 2200 and the weights 2206 of neural network 2204.

Data Communications Architecture

Figure 4:
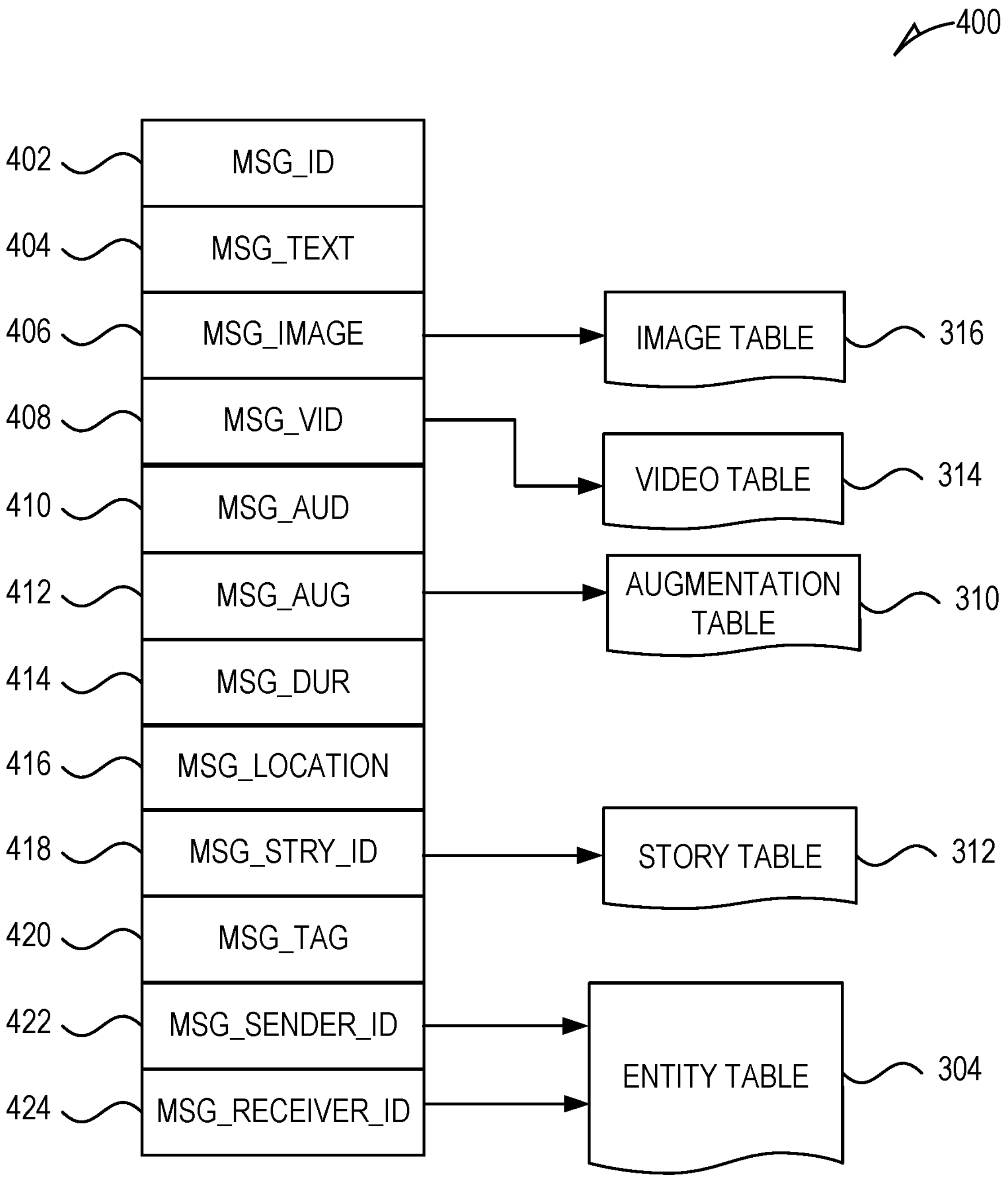
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier 402: a unique identifier that identifies the message 400. Message text payload 404: text, to be generated by a user via a user interface of the client device 102, and that is included in the message 400.

Message image payload 406: image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414: parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
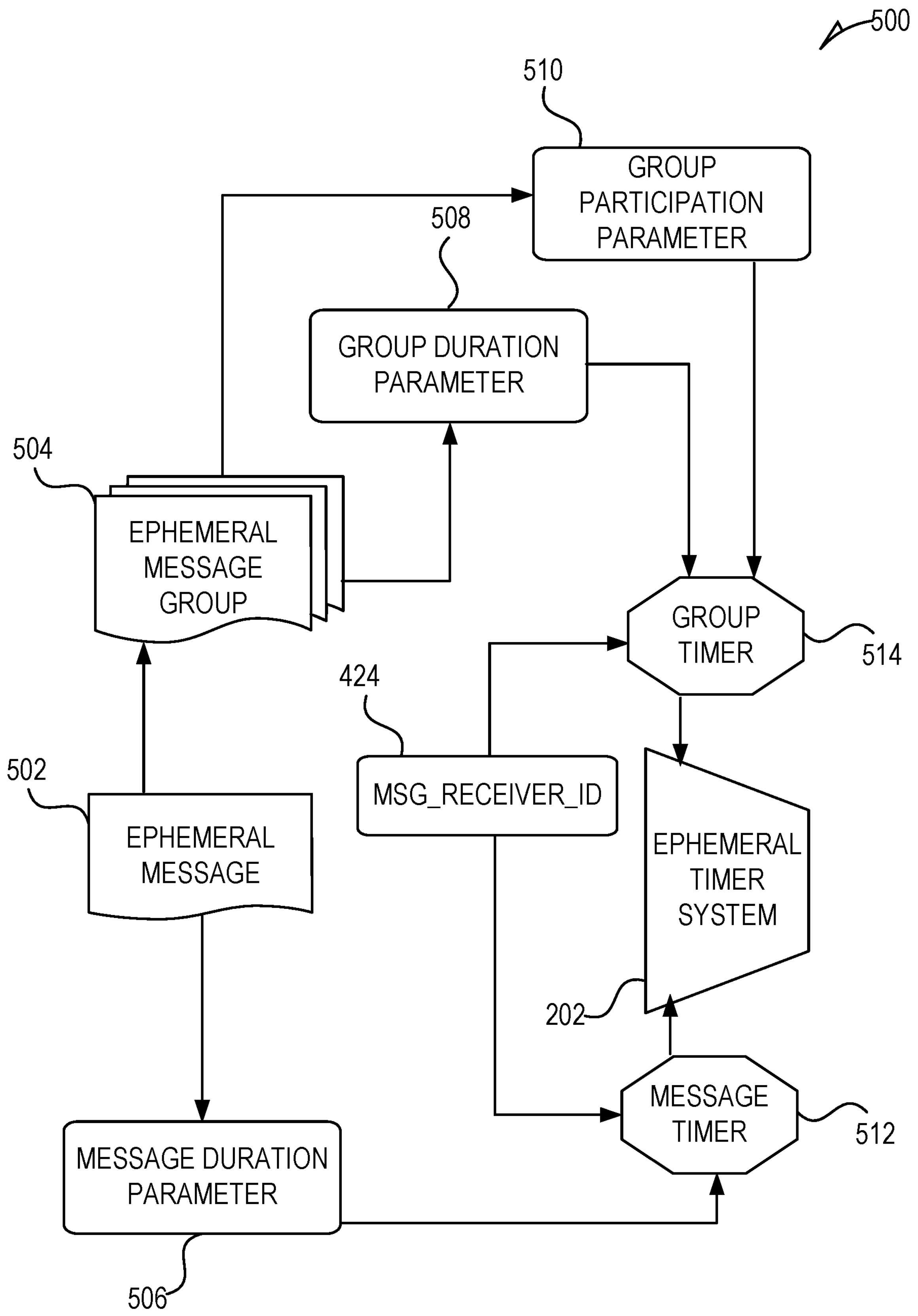
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Virtual Clothing Try-on

FIG. 6 illustrates the operation 600 of a virtual clothing try-on module 606, in accordance with some embodiments. Virtual clothing try-on module 606 takes an input image 602 and a clothing image 604 and processes the images to generate processed image 608. The AR image 608 enables a person in the input image 602 to virtually try on the clothing of the clothing image 604.

Figure 7:
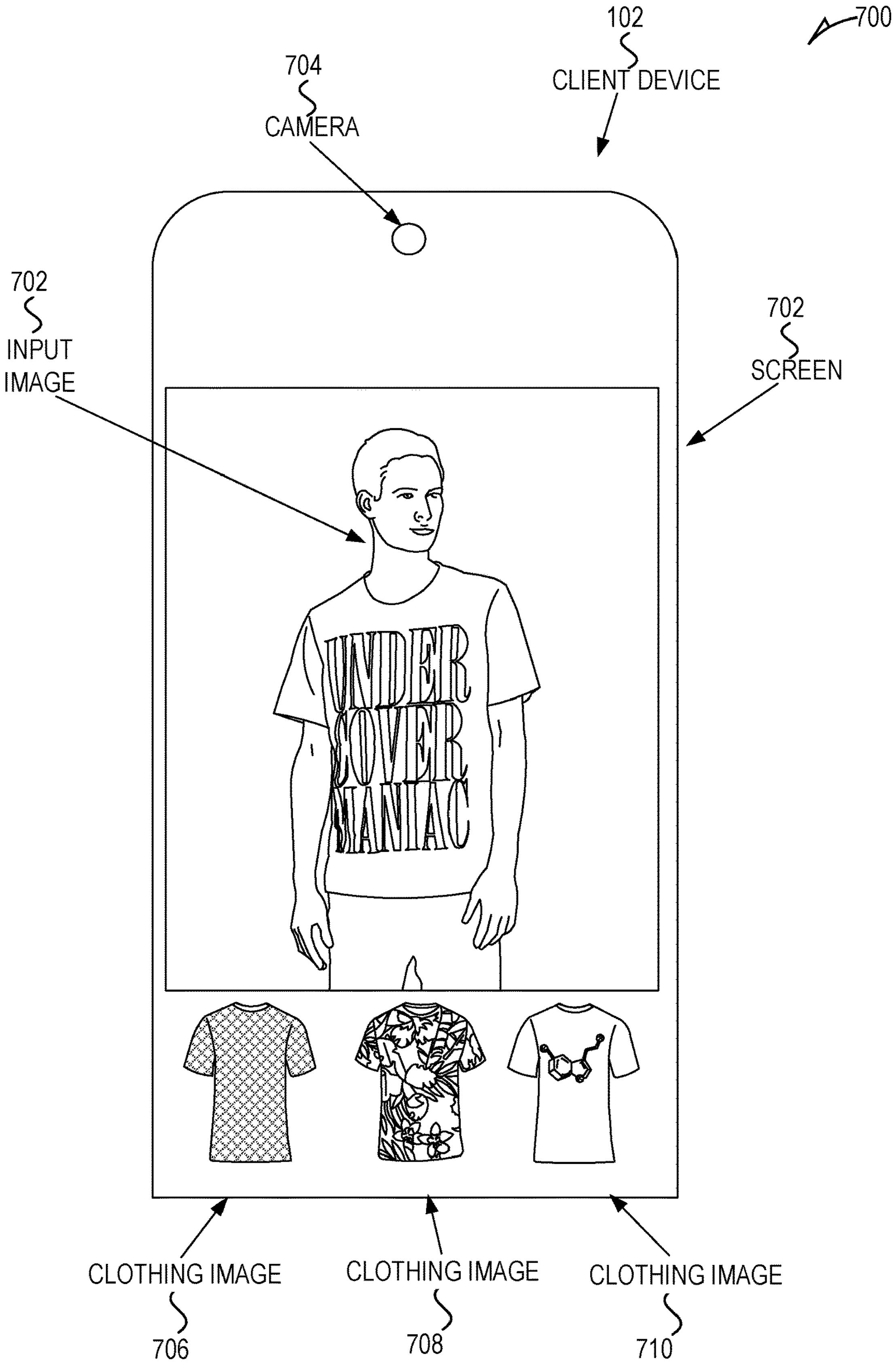
FIG. 7 illustrates the operation of the interface module, in accordance with some embodiments.

The person image 602 is an input image of a person that may be from a camera such as camera 704 of FIG. 7. The images are composed of pixels that include intensity and color values, in accordance with some embodiments. The images may include channels or layers of information, where each channel includes information for pixels. The images have a dimensionality of pixels indicating a width and a height.

The clothing image 604 is a front image of a t-shirt, in accordance with some embodiments. In some embodiments, the input image 602 is a frontal image of the person and clothing image 604 is an image of a t-shirt with a flat lay. In some embodiments, the clothing image 604 is an image from a shopping site of clothing that may be available for purchase. In some embodiments the input image 602 is an image on a mobile device or computing device that is a live image of a person while the person is shopping. The person of the input image 602 may evaluate clothing by viewing the AR image 608, which may be displayed on a screen of a mobile device or computing device. Interface module 610 is configured to provide an interface for a user of the virtual clothing try-on module 606 as disclosed herein.

FIG. 7 illustrates the operation 700 of the interface module 610, in accordance with some embodiments. A user is using a client device 102 with an input image 702 displayed on the screen 702. The interface module 610 is displaying clothing image 706, clothing image 708, and clothing image 710, as options to try-on the clothing on the person in the input image 702. In some embodiments the input image 702 is a live image from camera 704. In some embodiments the input image 702 is an image from the messaging system. In some embodiments the input image 702 is a saved image. In some embodiments the input image 702 is an image from the internet.

Figure 8:
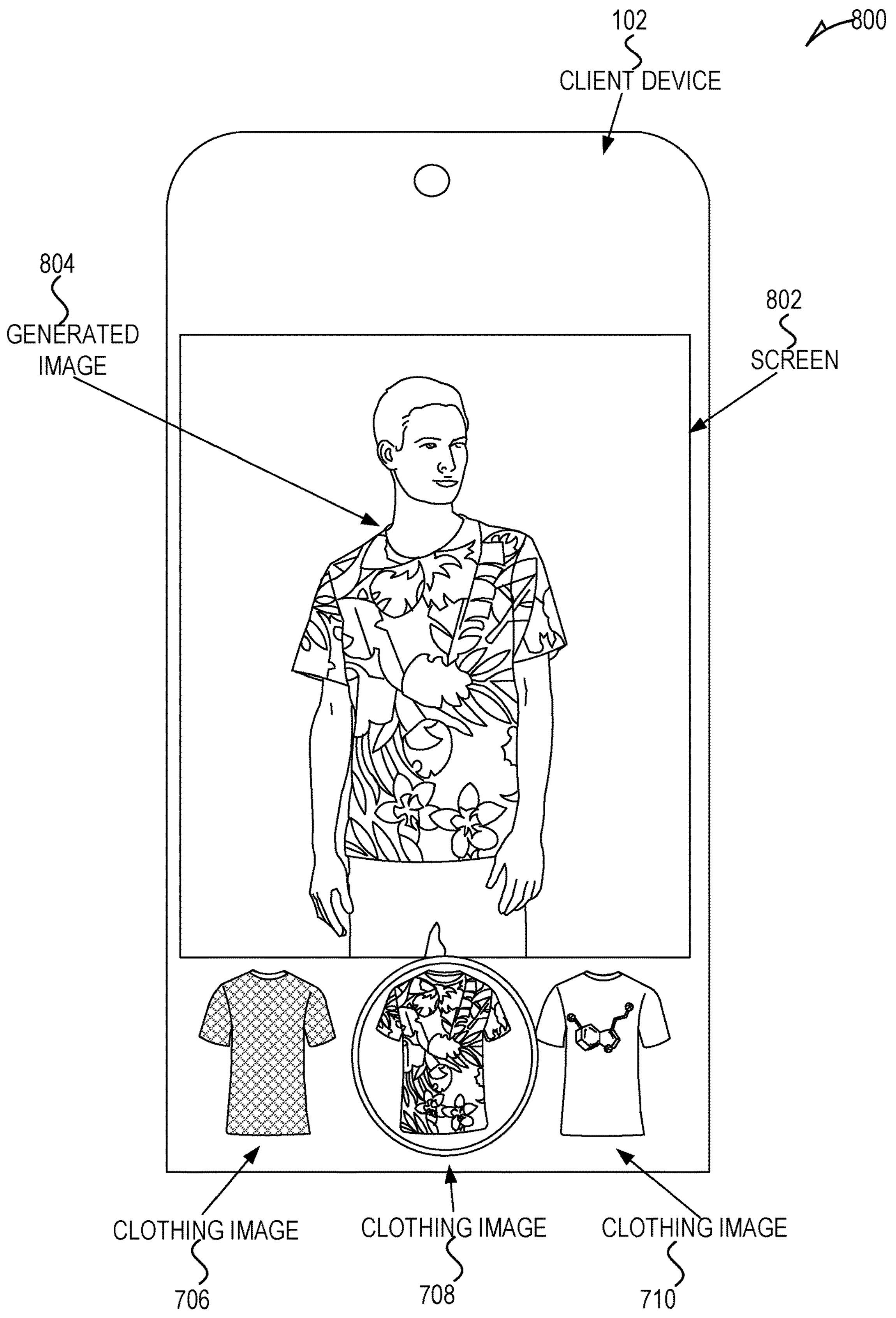
FIG. 8 illustrates the operation of the interface module, in accordance with some embodiments.

FIG. 8 illustrates the operation 800 of the interface module 610, in accordance with some embodiments. The user has selected clothing image 708 for a virtual clothing try-on for the person in the input image 702 of FIG. 7. The interface module 610 has called virtual clothing try-on module 606 with input image 702 and clothing image 708 as input, which has processed the images to output generated image 804. In some embodiments the interface module 610 and virtual clothing try-on module 606 perform their operations on the client device 102.

Figure 9:
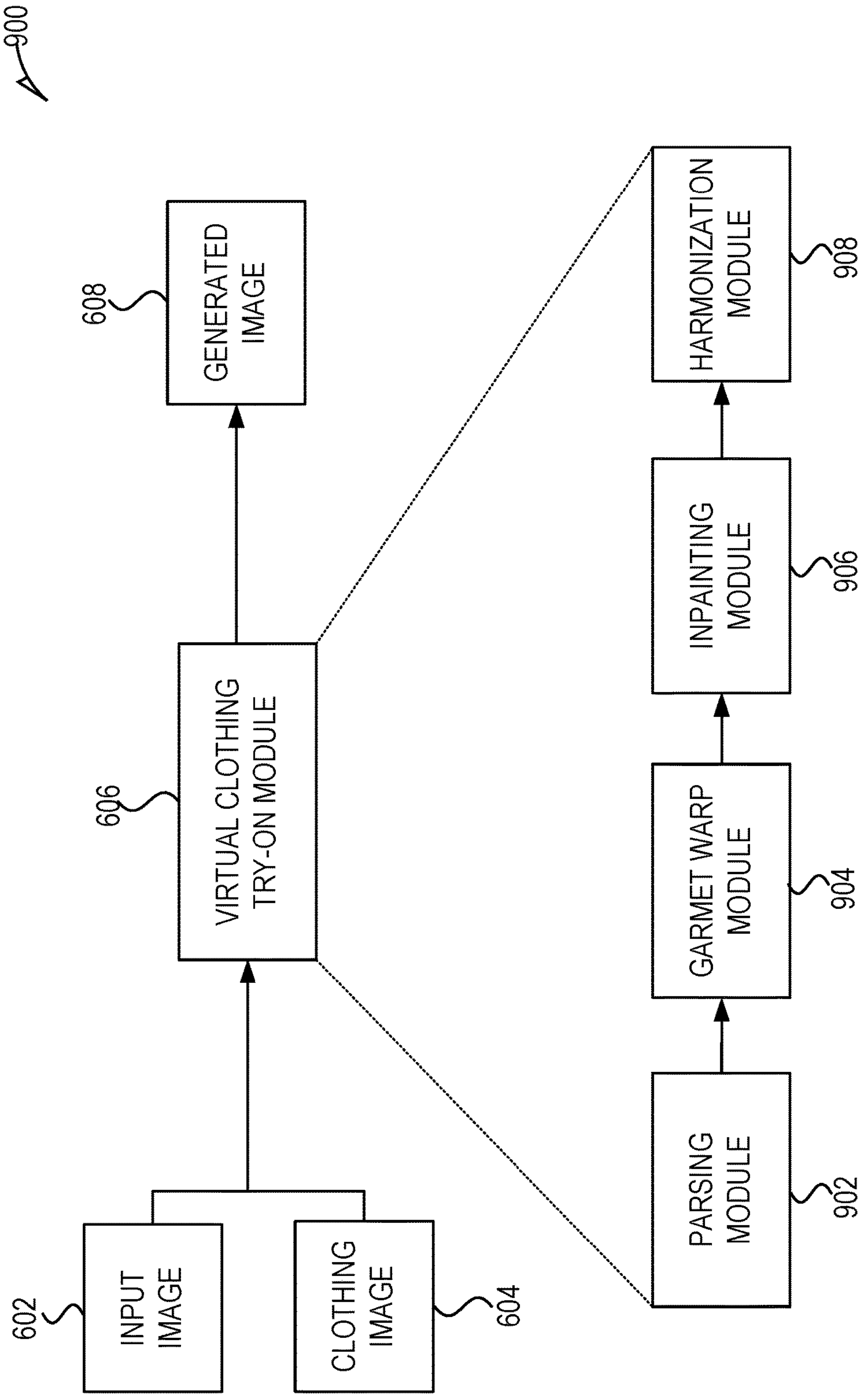
FIG. 9 illustrates the operation of the virtual clothing try-on module, in accordance with some embodiments.

FIG. 9 illustrates the operation 900 of the virtual clothing try-on module 606, in accordance with some embodiments. The virtual clothing try-on module 606 includes parsing module 902, garment warp module 904, inpainting module 906, and harmonization module 908, in accordance with some embodiments.

Figure 10:
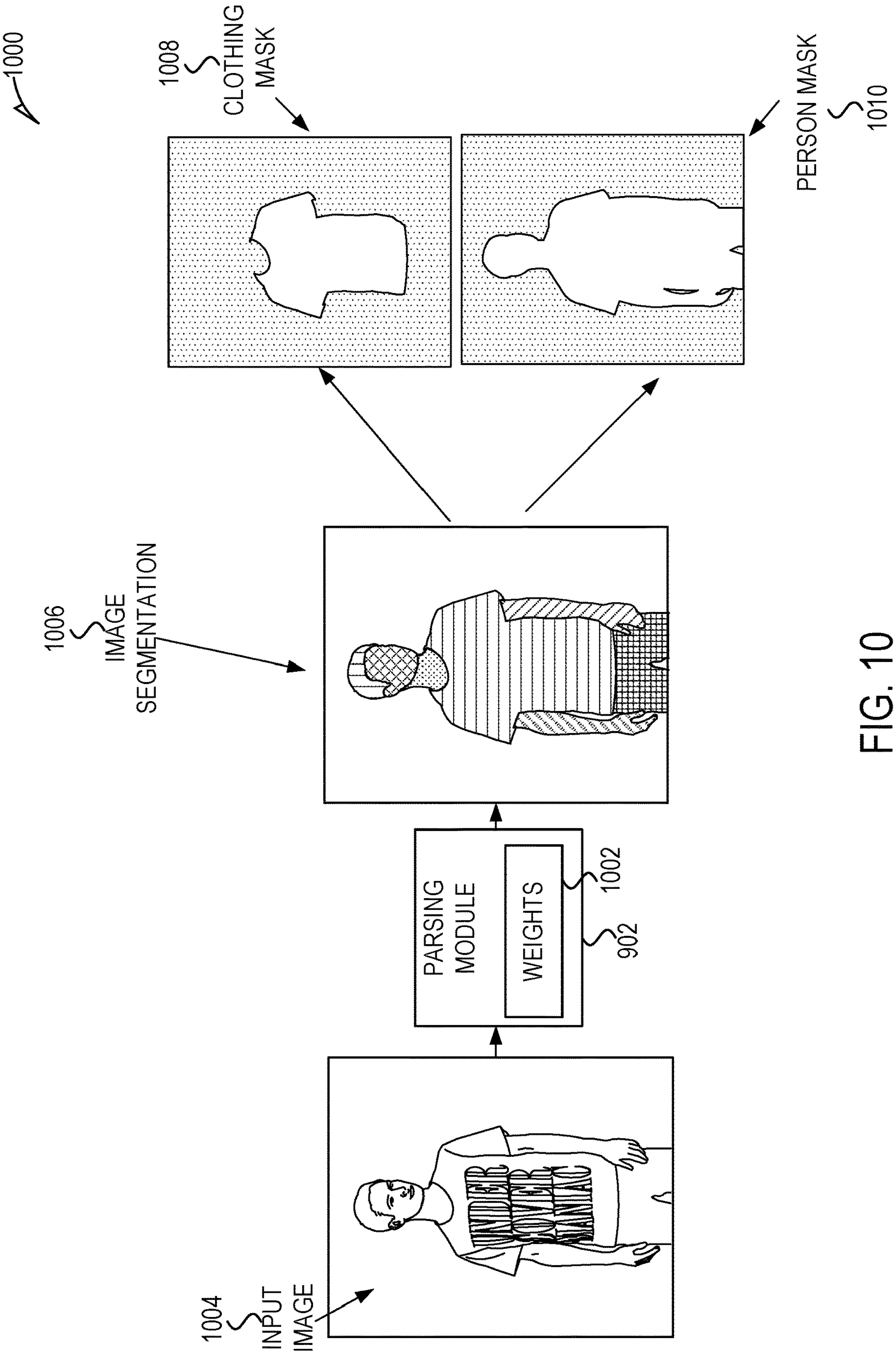
FIG. 10 illustrates the operation of the parsing module, in accordance with some embodiments.

FIG. 10 illustrates the operation 1000 of the parsing module 902, in accordance with some embodiments. The parsing module 602 processes input image 1004 to generate image segmentation 1006, clothing segment 1004, and person segment 1006.

The clothing mask 1008 and person mask 1010 is derived from the image segmentation 1006, in accordance with some embodiments. In some embodiments the parsing module 902 is a trained convolution neural network (CNN) with multiple hierarchical semantic graphs. For example, a first hierarchical semantic graph may include nodes for body parts of a human such as upper arms with a connection to torso, and torso may indicate a connection to head. The head node may have an inter-graph connection to a second hierarchical semantic graph to nodes hair, face, and hat. The hat node of the second hierarchical semantic graph may have an inter-graph connection to a third hierarchical semantic graph to nodes cap and helmet. The connections between the nodes may be directed. The hierarchical semantic graphs may be devised by a person in building the CNN. In some embodiments the hierarchical sematic graphs are repeated with convolution layers between the hierarchical sematic graphs.

In some embodiments a ground truth dataset is used to train the parsing module 602 to train the weights 902. The ground truth dataset includes thousands of images with pixel-wise annotations on semantic part labels corresponding to nodes of the hierarchical semantic graphs. The images include people in various positions. The image segmentation 1006 may label each of the different segments with one or more labels. As illustrated parsing module 902 labels the various segments of the image segmentation 1006 and the clothing that is a shirt is separated out and turned into a clothing mask 1008. The process of turning an image segment into a mask is to blacken all pixels that are not part of the clothing and to turn all pixels that are part of the clothing as white. The parsing module 902 may be trained using the ground truth dataset that includes the input image 1004 and an image segmentation 1006. The losses may be determined based on bitwise losses between the image segmentation 1006 generated by the parsing module 902 and the ground truth image segmentation 1006, in accordance with some embodiments. The weights 902 may be adjusted using backpropagation and gradient descent, in accordance with some embodiments.

Figure 11:
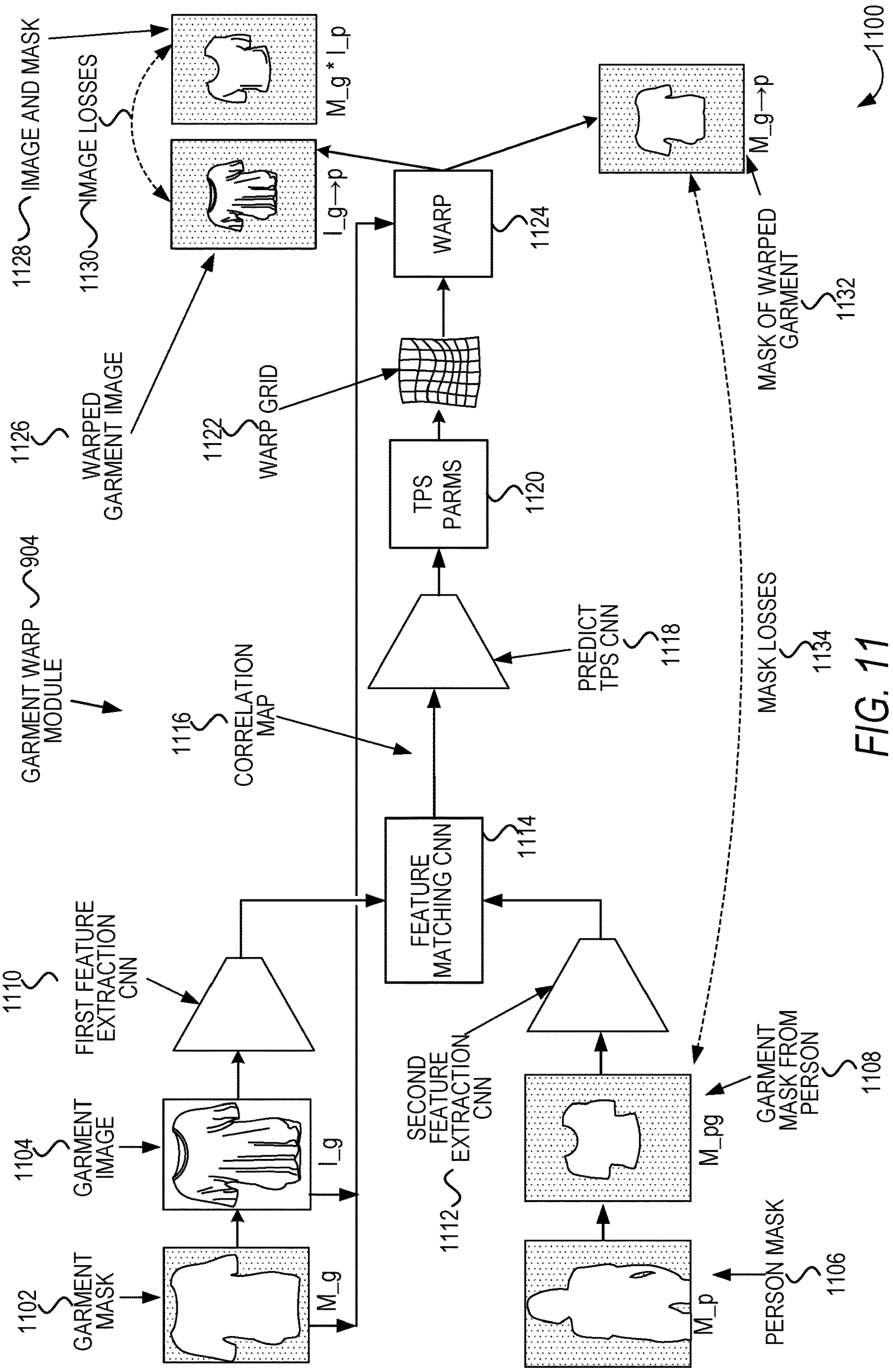
FIG. 11 illustrates the operation of training the garment warp module 904, in accordance with some embodiments.

FIG. 11 illustrates the operation 1100 of training the garment warp module 904, in accordance with some embodiments. First feature extraction CNN 1110 processes the garment mask 1102 and garment image 1104 and feeds the output features into feature matching CNN 1114. Second feature extraction CNN 1112 processes person mask 1106 and garment mask from person 1108 and feeds the output features into feature matching 1114. Feature matching CNN 1114 processes the extracted features from the first feature extraction CNN 1110 and the second feature extraction CNN 1112 and generates a correlation map 1116. CNN 1118 processes the correlation map 1116 and generates thin-plate spline (TPS) transformation parameters (C). In some embodiments parsing module 902 generates warp grid 1122 based on the TPS transformation parameters. In some embodiments the warp grid 1122 is generated from processing the correlation map 1116 or output from the feature matching 1114. Warp 1124 processes the warp grid 1122 with the garment mask 1102 and garment image 1104 to generate the warped garment image 1126 and mask of warped garment 1132.

The losses for the output for the garment warp module 904 are determined based on the mask losses 1134 between the garment mask from person 1108 and the mask of warped garment 1132 and based on the image losses 1130 between the warped garment image 1126 and the image and mask image 1128. The image and mask image 1128 is a combination of the garment mask from person 1108 and the image of the person such as input image 1004. The losses are determined using pixel losses, in accordance with some embodiments.

Each of the first feature extraction CNN 1110, second feature extraction CNN 1112, feature matching CNN 1114, predict TPS CNN 1118, TPS parameters (parms) 1120, and warp 1124 may be a CNN that has weights. All of these may be trained in an end-to-end pipeline where the losses are determined as disclosed herein and the learning method is back propagation with gradient descent, in accordance with some embodiments.

The training set includes person mask 1106, garment mask from person 1108, garment mask 1102, garment image 1104, and image and mask 1128. The garment image 1104 is of the same garment that the person of the person mask 1106 is wearing but the garment of the garment image 1104 is warped differently. The training set is used as a ground truth to train the garment warp module 904 from end to end. The loss between two warp grids 1122 may be determined using Equation (1). Equation (1): $L_{reg}(G_x,G_y)=\Sigma_{i=-1,1}\Sigma_x\Sigma_y|G_x(x+i,y)-G_x(x,y)|+\Sigma_{j=-1,1}\Sigma_x\Sigma_y|G_x(x,y+j)-G_x(x,y)|$, where G is the warp grid, and x and y are coordinates on the warp grid.

Figure 12:
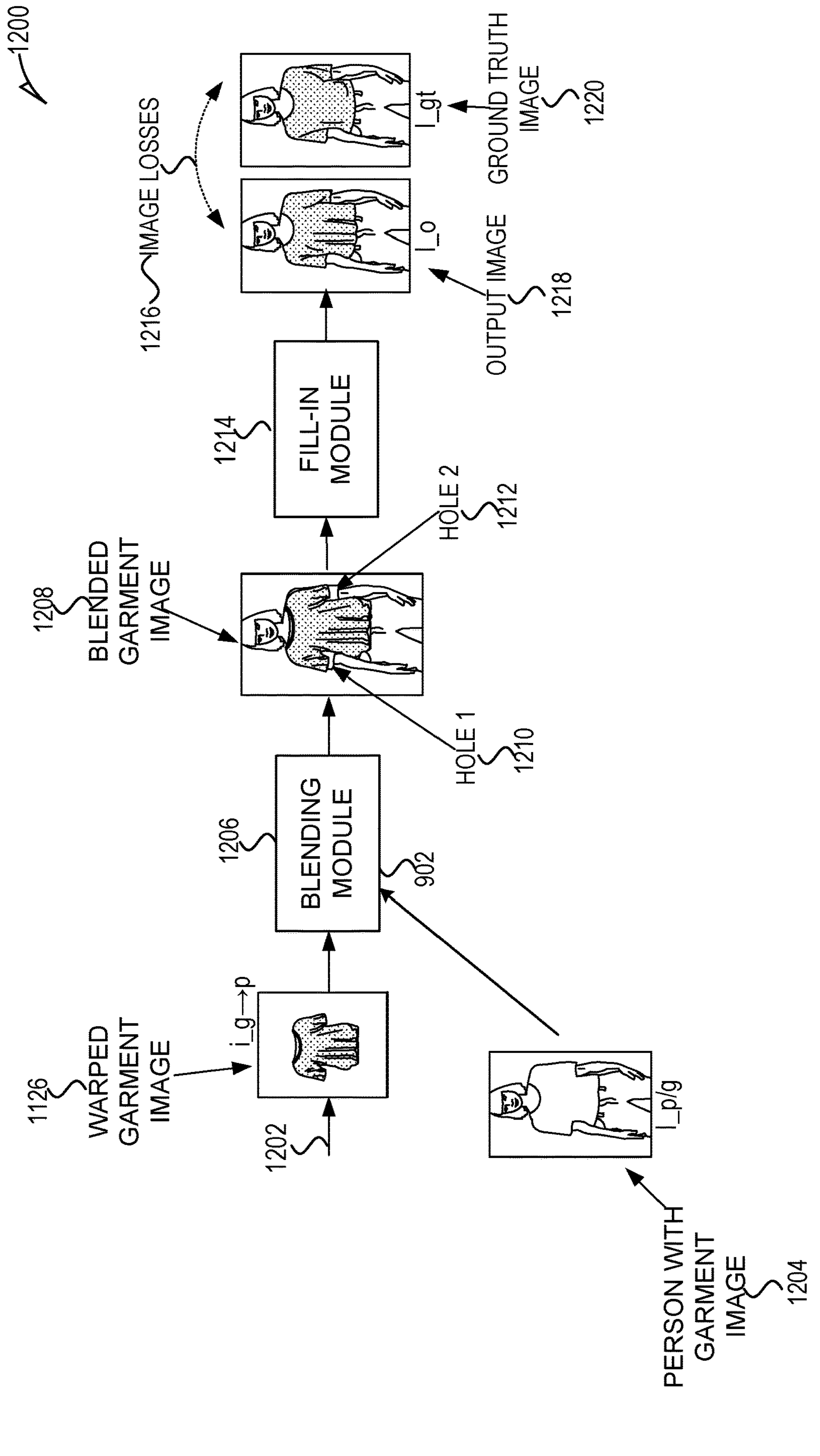
FIG. 12 illustrates the training of the inpainting module, in accordance with some embodiments.

FIG. 12 illustrates the training 1200 of the inpainting module 906, in accordance with some embodiments. The warped garment image 1126 is output 1202 or generated from the garment warp module 904 from FIG. 11. The blending module 1206 takes the warped garment image 1126 and the person with garment image 1204 and processes the inputs to generate the blended garment image 1208. The person with garment image 1204 may be the person image with the garment image 1104.

The blended garment image 1208 includes hole 1 1210 and hole 2 1212, which are a result of the warped garment image 1126 being a different size than the garment that the person with the garment image 1204 is wearing. Hole 1 1210 and hole 2 1212 may be white because the warped garment image 1126 has a white background.

Fill-in module 1214 processes the blended garment image 1208 and generates output image 1218. The losses for training are determined by a bitwise comparison of output image 1218 and ground truth image 1220, in accordance with some embodiments. The ground truth image 1220 is of the person from which the person mask 1106 and garment mask from person 1108 are derived as described in FIG. 11. In some embodiments fill-in module 1214 is a generative CNN (GCNN) or generative adversarial CNN (GAN) that has weights that are trained by a gradient descent based on the image losses 1216.

Figure 13:
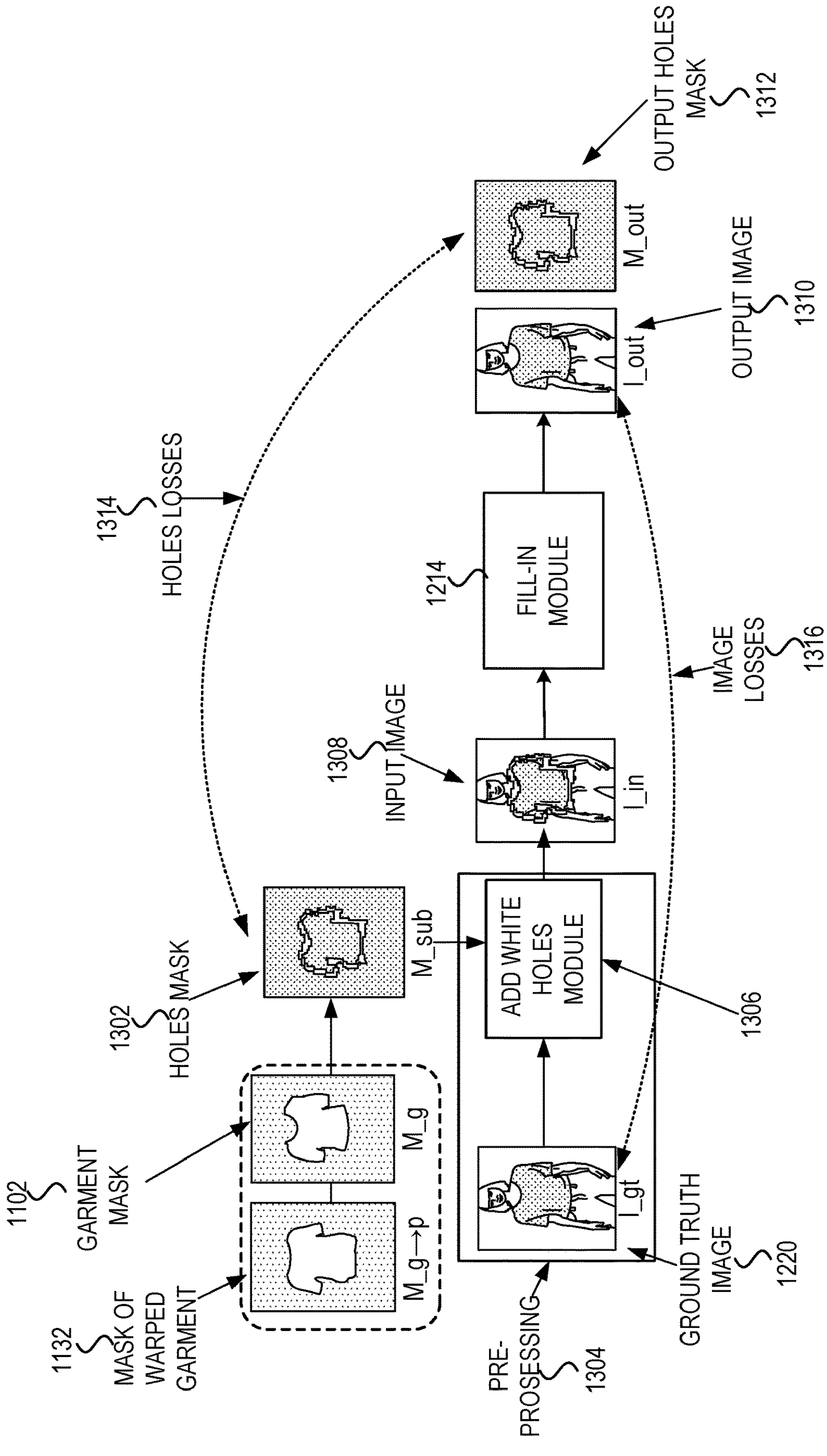
FIG. 13 illustrates the operation of training the fill-in module, in accordance with some embodiments.

FIG. 13 illustrates the operation 1300 of training the fill-in module 1214, in accordance with some embodiments. The mask of warped garment 1132 from FIG. 11 and garment mask 1102 are processed by subtracting the garment mask 1102 from the mask of warped garment 1132 to generate the holes mask 1302. Add white holes module 1306 processes ground truth image 1220 from FIG. 12 and holes mask 1302 to generate input image 1308. The fill-in module 1214 processes the input image 1308 to generate output image 1310, which may be the same or similar as output image 1126, and output holes mask 1312.

The losses are determined based on holes losses 1314 between the output hole mask 1312 and the holes mask 1302 and the image losses 1316 between the output image 1310 and the ground truth image 1220. Output hole mask 1312 is determined by a mask of garment from the output image 1310 subtracted by the garment mask 1102. The fill-in module 1214 may be a GNN that has weights that are trained by a gradient descent based on the determined losses.

Figure 14:
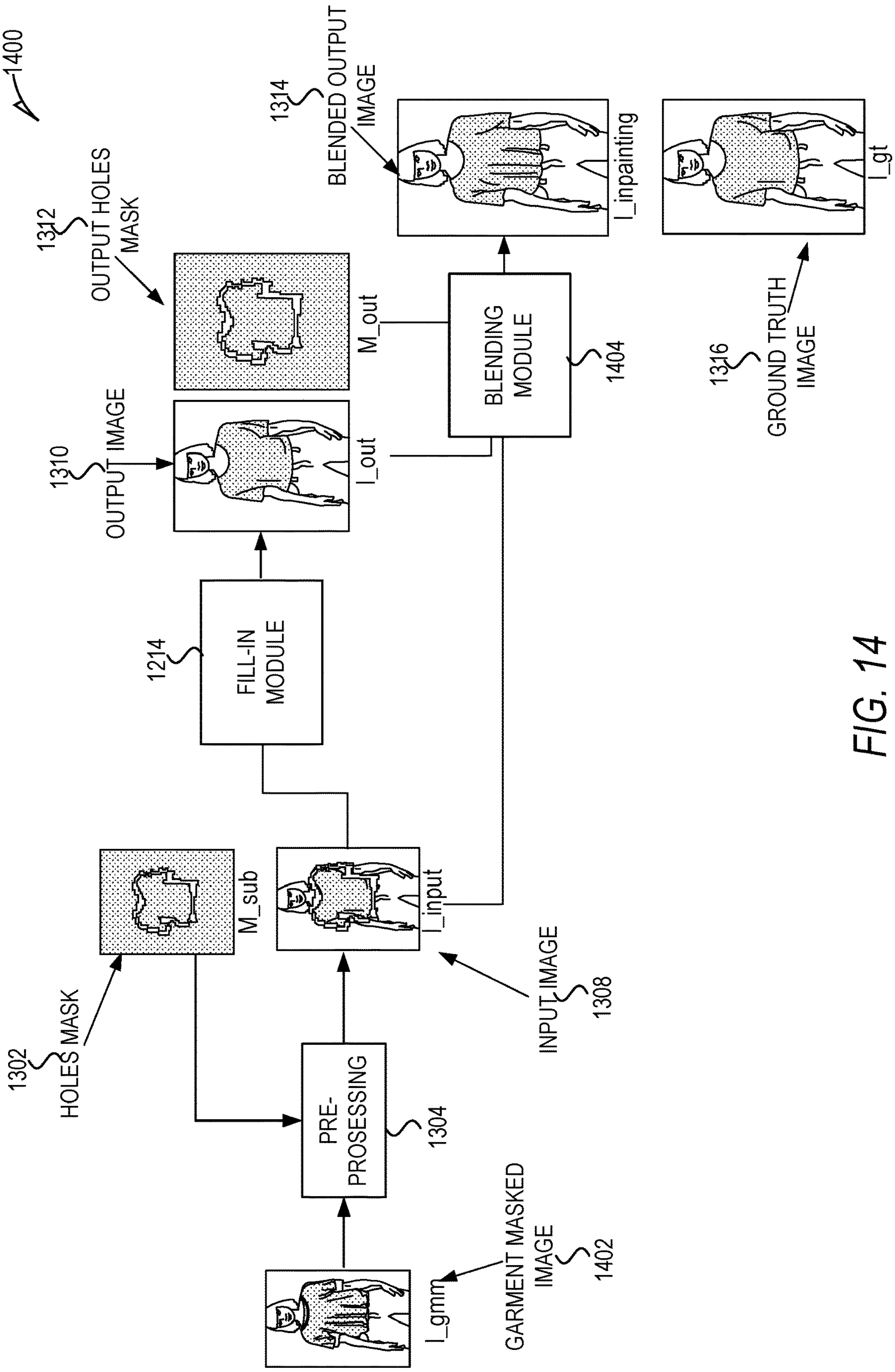
FIG. 14 illustrates the operation of blending module, in accordance with some embodiments.

FIG. 14 illustrates the operation 1400 of blending module 1404, in accordance with some embodiments. Preprocessing

1304 from FIG. 13 processes the garment masked image 1402 and the holes mask 1302 to generate input image 1308. Fill-in module 1214 from FIG. 12 processes input image 1308 and generates output image 1310. The blending module 1404 processes output image 1310 and output holes mask 1312 to generate blended output image 1314. Ground truth image 1316 is illustrated for comparison.

Figure 15:
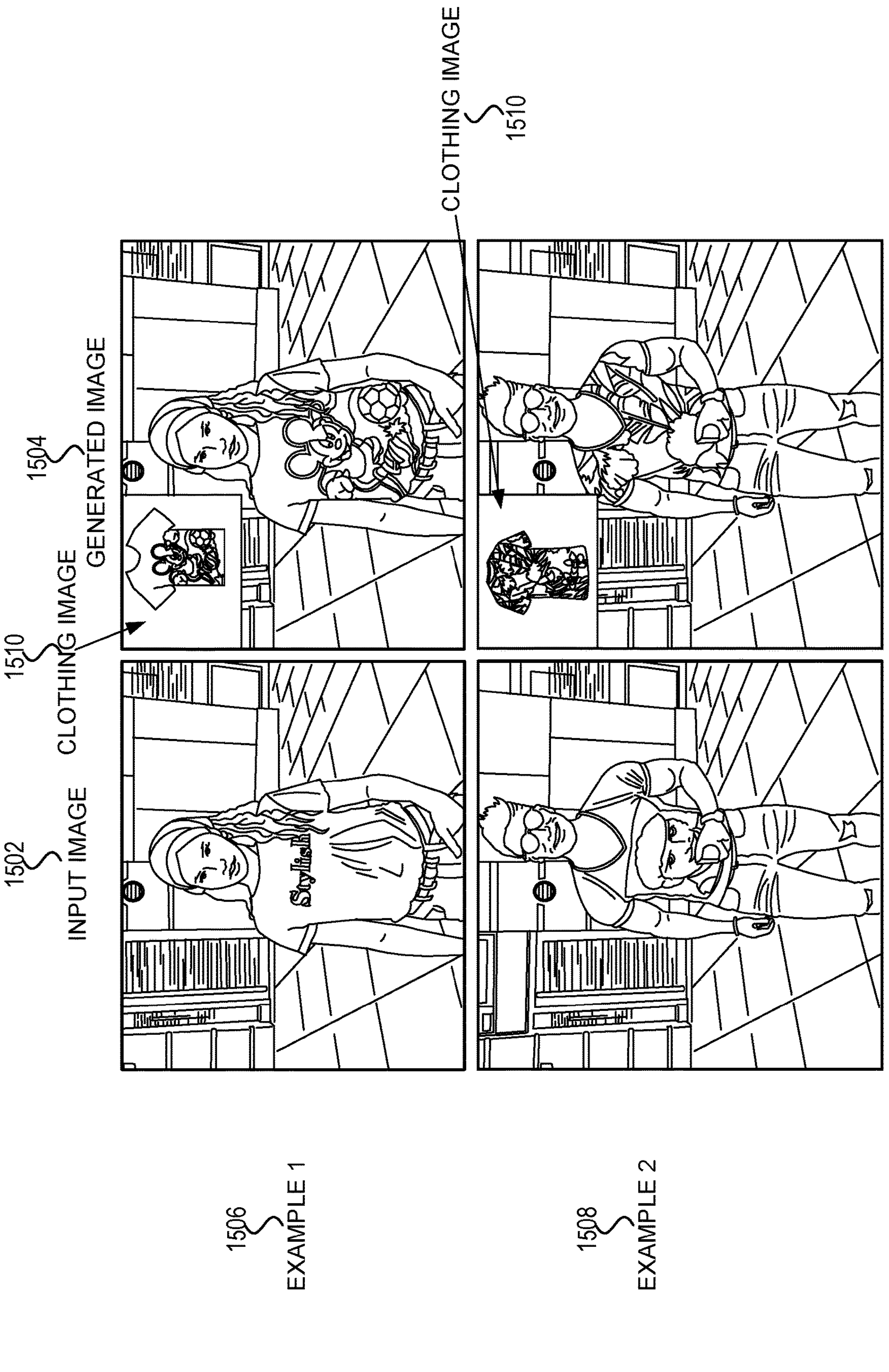
FIG. 15 illustrates results of virtual clothing try-on module, in accordance with some embodiments.

FIG. 15 illustrates results of virtual clothing try-on module 606, in accordance with some embodiments. In example 1 1506, input image 1502 and clothing image 1510 are processed by virtual clothing try-on module 606 to generate generated image 1504. In example 2 1508, input image 1502 and clothing image 1510 are processed by virtual clothing try-on module 606 to generate generated image 1504.

Figure 16:
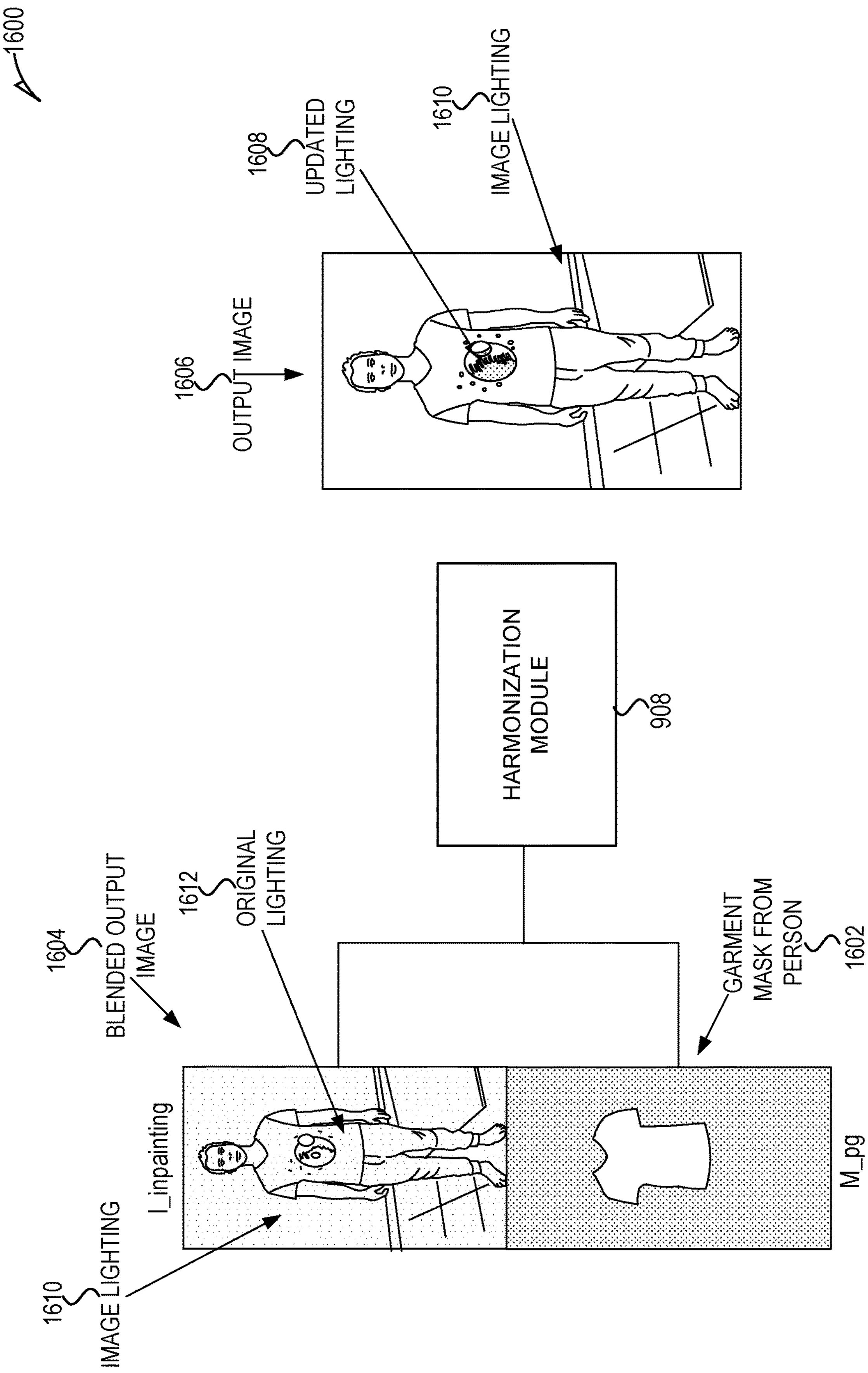
FIG. 16 illustrates the operation of the harmonization module, in accordance with some embodiments.

FIG. 16 illustrates the operation of the harmonization module 908, in accordance with some embodiments. The harmonization module 908 processes the blended output image 1604 and the garment mask from person 1602 to generate the output image 1606. The harmonization module 908 may modify the original lighting 1612 on the portion of the output image 1606 that corresponds to the garment mask from person 1602. The blended output image 1604 may have the clothing image 604 from FIG. 9 incorporated into the blended output image 1604 but the lighting may not be in accordance with the image lighting 1610 in the rest of the output image 1606 because the lighting of the clothing image 604 may be different than the image lighting 610 of the input image 602 of FIG. 6.

Figure 17:
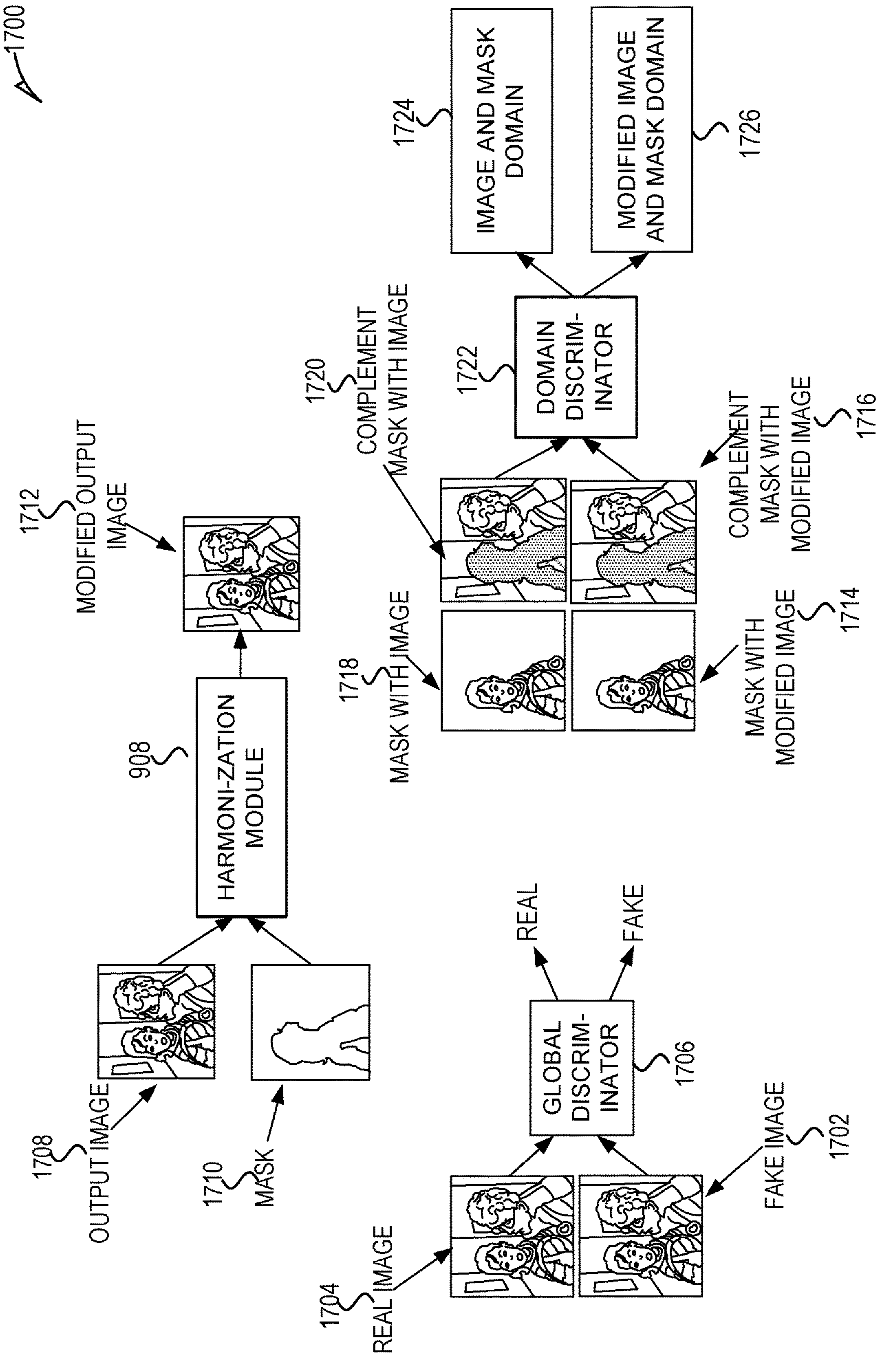
FIG. 17 illustrates the operation of training the harmonization module, in accordance with some embodiments.

FIG. 17 illustrates the operation 1700 of training the harmonization module 908, in accordance with some embodiments. The global discriminator 1706 processes real image 1704 or fake image 1702 and determines whether the process image is real or fake. The global discriminator 1706 is trained in conjunction with the harmonization module 908 where together they are an adversarial convolution neural network. The harmonization module 908 processes mask 1710 and output image 1708 to generate modified output image 1712, which may have the light adjusted in areas that correspond to the mask 1710.

Domain discriminator 1722 processes mask with image 1718 and complement mask with image 1720 to determine image and mask domain 1724, which indicates a similarity between the mask area and the image without the mask area of the image. Similarly, domain discriminator 1722 processes mask with image modified image 1714 and complement mask with modified image 1716 to determine modified image and mask domain 1726, which indicates a similarity between the mask area and the modified image without the mask area of the modified image. The harmonization module 908 may be trained based on minimizing the loss of image and mask domain 1724 and modified image and mask domain 1726.

Figure 18:
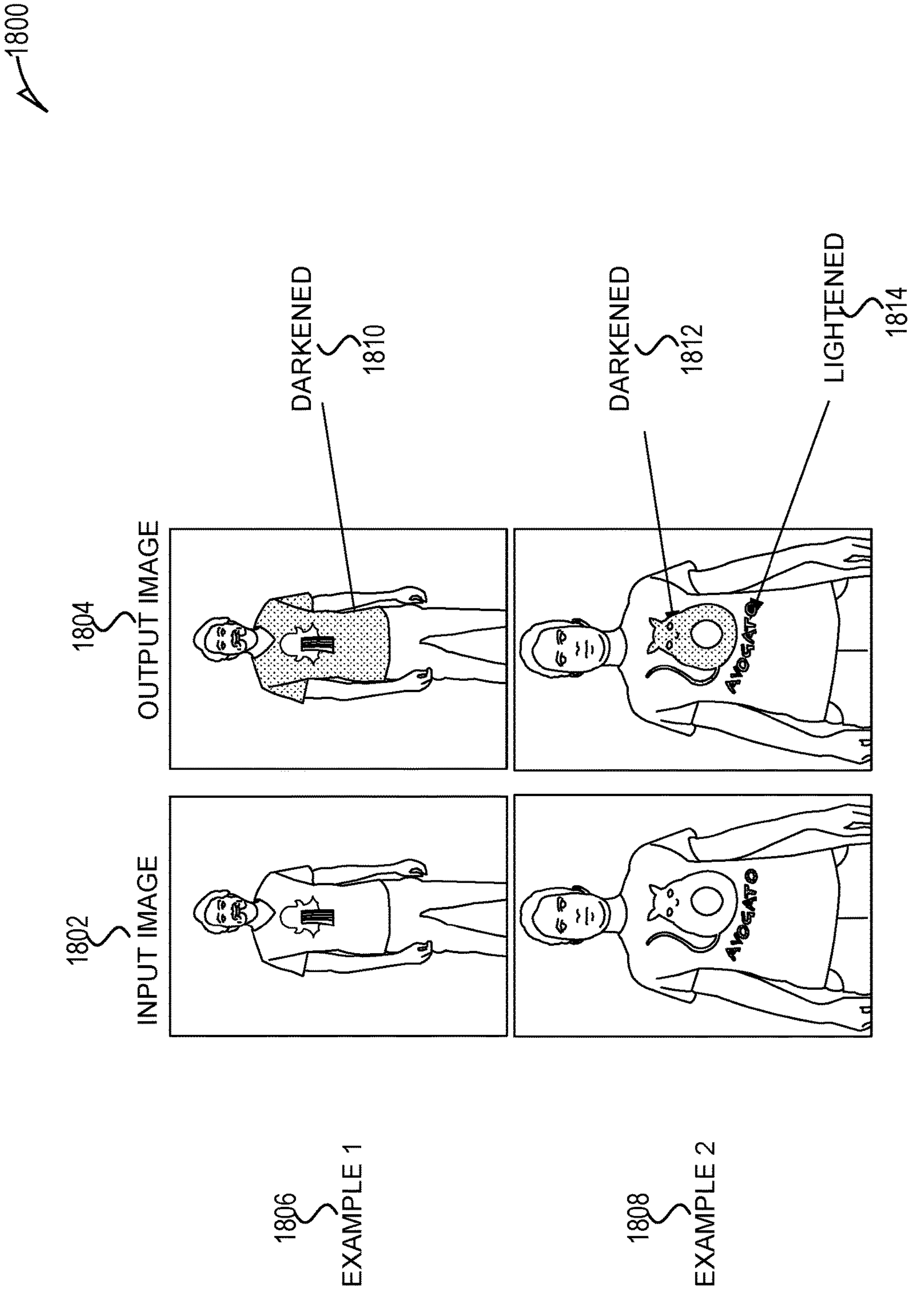
FIG. 18 illustrates the operation of the harmonization module 908, in accordance with some embodiments.

FIG. 18 illustrates the operation 1800 of the harmonization module 908, in accordance with some embodiments. The harmonization module 908 processes input images 1802 to generate output images 1804. In example 1 1806 the output image 1804 is darkened 1810 in areas where a t-shirt has been added to better agree with the lighting of the rest of the image. In example 2 1808, portions of the output image 1804 are darkened 1182 to better agree with the lighting of the rest of the image and portions of the output image 1804 are lightened 1814 to better agree with the lighting of the rest of the output image 1804 that is not part of the t-shirt that was added to the image.

Figure 19:
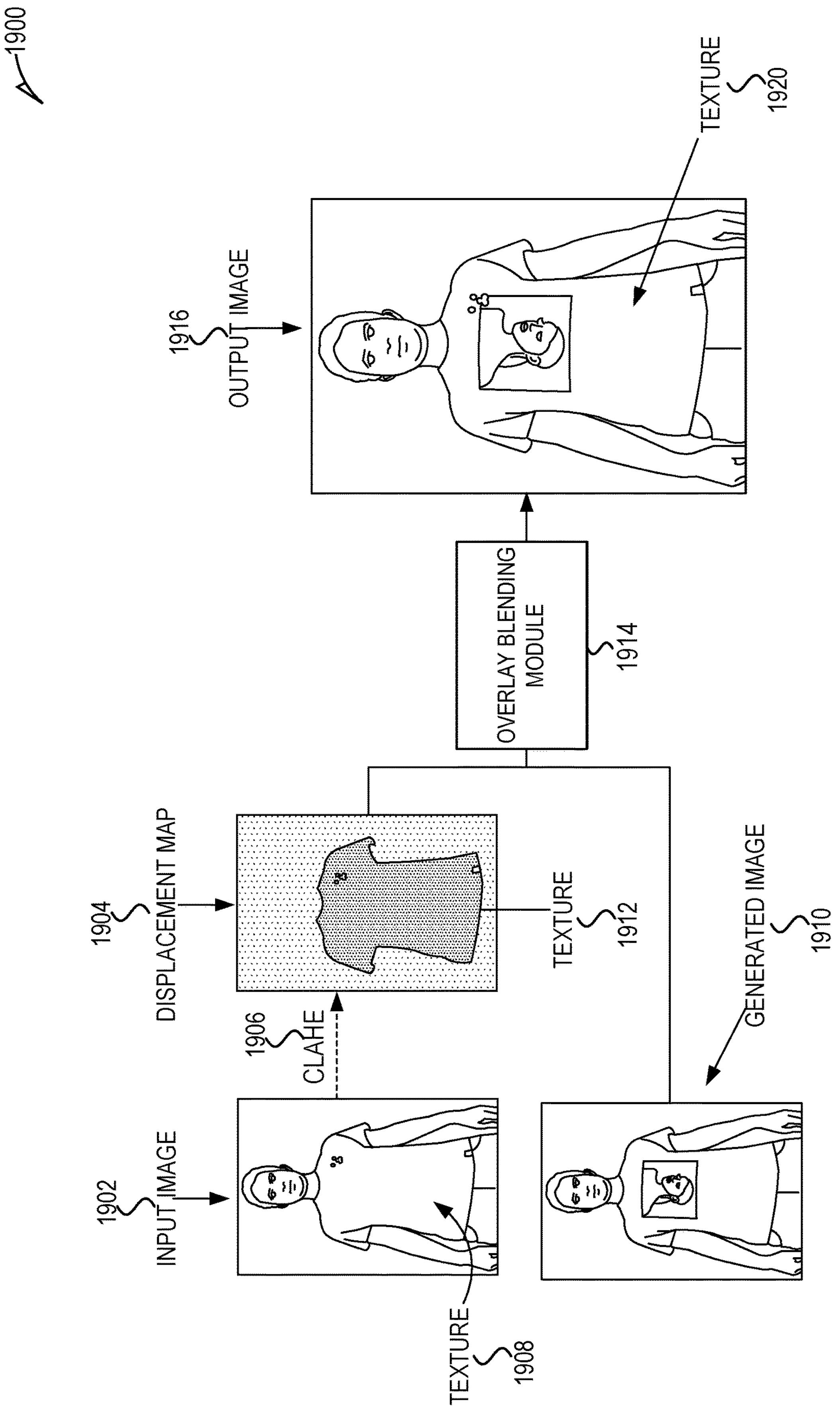
FIG. 19 illustrates the operation of post processing, in accordance with some embodiments.

FIG. 19 illustrates the operation 1900 of post processing, in accordance with some embodiments. Overlay blending module 1914 processes generated image 1910 and displacement map 1904 to generate output image 1916. Overlay blending module 1914 may be part of harmonization module 908 or may be performed before or after harmonization module 908. The output image 1916 includes texture 1920 that is not in the generated image 1910, which may be the same or similar as generated image 608 and would be the image in the pipeline leading to overlay blending module 1914. The input image 1902, which may be the same or similar as input image 602 of FIG. 9, includes the texture 1908 and is processed by overlay blending module 1914 to generate displacement map 1904. In some embodiments input image 1902 is processed in accordance with contrast limited adaptive histogram equalization (AHE) (CLAHE) 1906, which is an adaptive histogram equalization in which contrast amplification is limited, which reduces noise and brings out the texture. The overlay blending module 1914 may be a CNN or ACN that is trained to perform post-processing to add texture to the generated image 1910 from the input image 1902.

FIG. 20 illustrates elements of a dataset 2000, in accordance with some embodiments. The person image 2002 is of a person that is wearing the same garment that is in the garment image 2006. The person image 2002 has a height of 256 pixels and a width of 192 pixels, in accordance with some embodiments. The number of pixels may be different. Each pixel includes color information and there may be multiple channels or layers of color information. The segment image 2004 is the person image 2002 segmented into different segments for the different garments the person is wearing and segmented to only include the person. The garment image 2006 is an image of the garment that the person of the person image 2002 is wearing but not in a same shape. The garment image 2006 illustrates the garment in a flat lay position, in accordance with some embodiments. In some embodiments the garment image 2006 illustrates the garment in a different position. In some embodiments the garment image 2006 is of the garment in a standard position that is used for online sales. The person image 2002, segment image 2004, and garment image 2006 may be used for a ground truth input and output for training the various neural networks disclosed herein.

Figure 21:
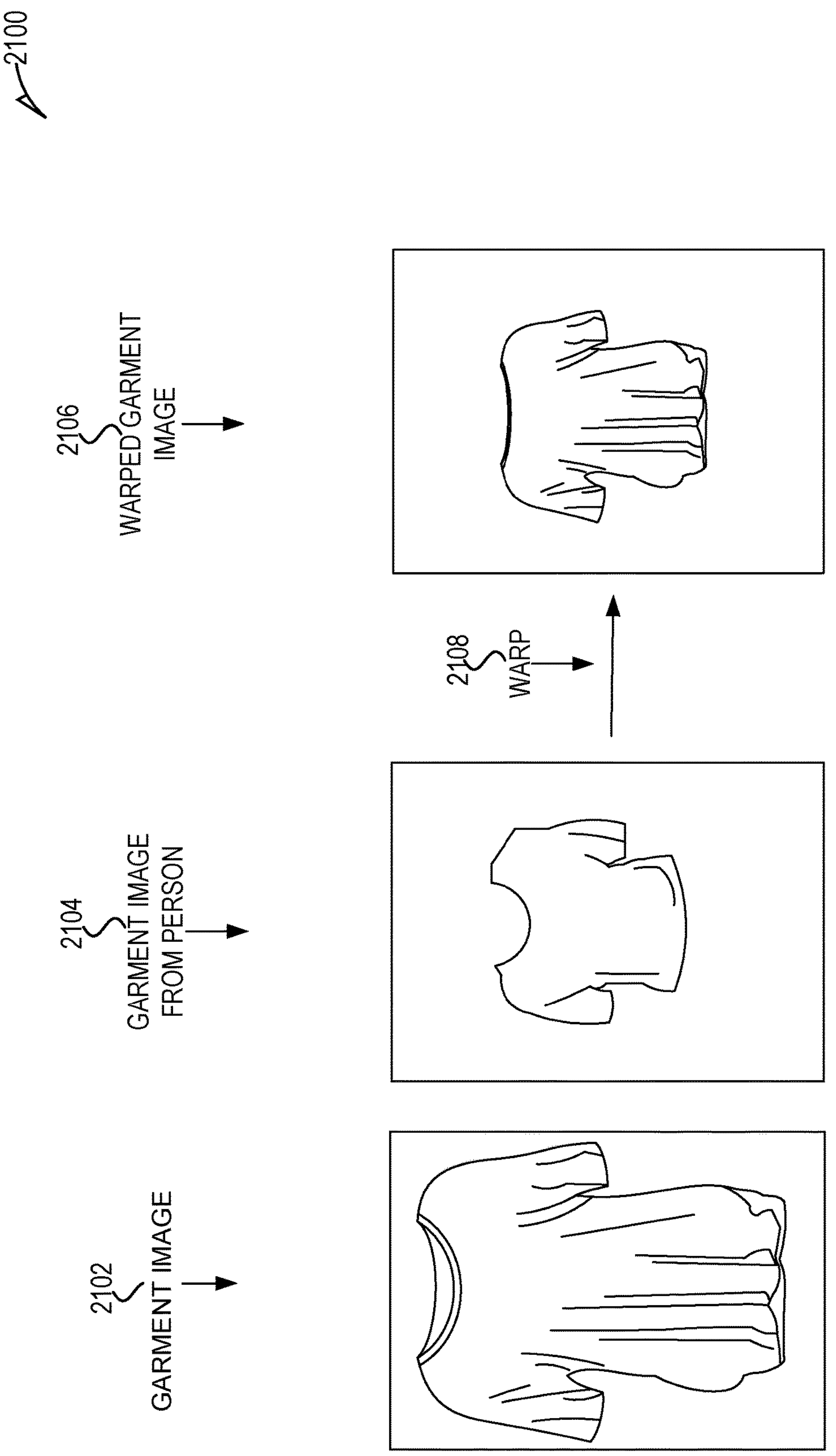
FIG. 21 illustrates the operation of warping, in accordance with some embodiments.

FIG. 21 illustrates the operation of warping, in accordance with some embodiments. A garment image 2102 is a target garment that is to be put on the image of a person such as garment 604 of FIG. 6. The garment image from person 2104 is a current garment the person is wearing. The goal of warp 2108 is to warp garment image 2102 is try and make it warped and sized in a same way as the garment image from person 2104 so that the warped garment image 2106 will fit on the person of the generated image 608 in a natural way.

FIG. 22 illustrates the operation of training a neural network, in accordance with some embodiments. The training set 2200 may be a ground truth such as from the dataset disclosed in conjunction with FIG. 20. The training module 2202 trains the neural network 2204 in accordance with the gradient descent and backpropagation in accordance with the losses disclosed in conjunction with descriptions of the neural networks. The neural networks 2204 are the various neural network disclosed herein. The weights 2206 are the weights and parameters associated with the neural network 2204. The training module 2202 trains the neural networks 2204 to modify the weights 2206 until the losses are below some threshold of error. The production module 2208 may then use the neural network 2210 with the weights 2206 to perform the various functions described herein such as perform functions of the virtual clothing try-on module 606.

Figure 23:
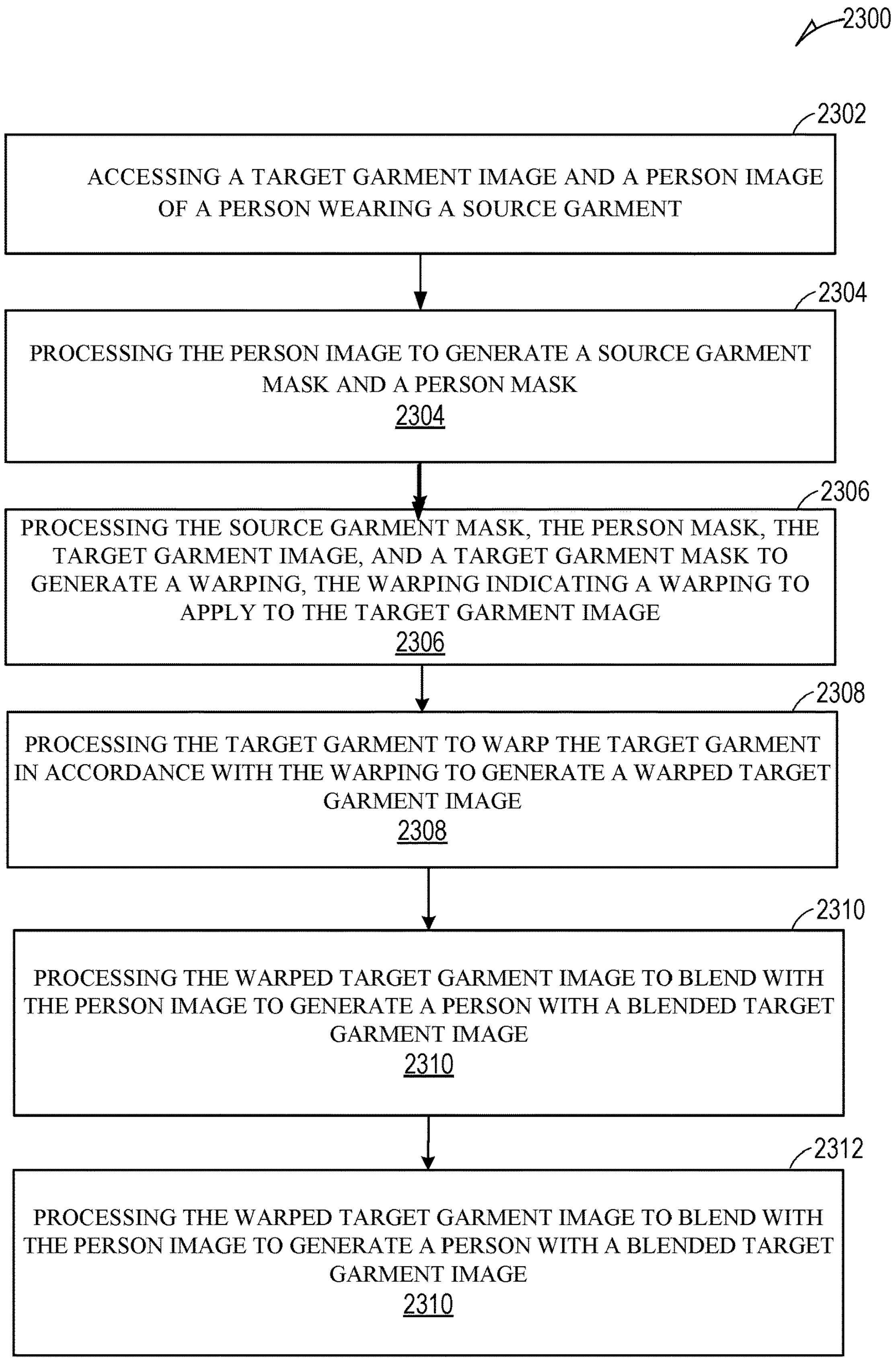
FIG. 23 illustrates a method of virtual try-on, in accordance with some embodiments.

FIG. 23 illustrates a method 2300 of virtual try-on, in accordance with some embodiments. The method begins at operation 2302 with accessing a target garment image and a person image of a person wearing a source garment. For example, input image 602 of FIG. 6 is the person image and garment image 604 is the target garment image.

The method 2300 continues at operation 2304 with processing the person image to generate a source garment mask and a person mask. For example, parsing module 902 of FIG. 10 generates person mask 1010 and clothing mask 1008 is the source garment mask.

The method 2300 continues at operation 2306 with processing the source garment mask, the person mask, the target garment image, and a target garment mask to generate a warping, the warping indicating a warping to apply to the target garment image. For example, referring to FIG. 11, the source garment mask is the garment mask from person 1108, the person mask is the person mask 1106, the target garment image is garment image 1104, and the target garment mask is the garment mask 1102. The warping I the warp grid 1122.

The method 2300 continues at operation 2308 with processing the target garment to warp the target garment in accordance with the warping to generate a warped target garment image. For example, warp 1124 of FIG. 11 warps the garment image 1104 to generate warped garment image 1126.

The method 2300 continues at operation 2310 with processing the warped target garment image to blend with the person image to generate a person with a blended target garment image. For example, referring to FIG. 12, warped garment image 1126 is blended by blending module 1206 with person with garment image 1204 to generate blended garment image 1208.

The method 2300 continues at operation 2312 with processing the person with blended target garment image to fill in holes to generate an output image, the holes being a difference between the warped target garment image and an image of the source garment. For example, referring to FIG. 12, the fill-in module 1214 processes the blended garment image 1208 to fill-in hole 1 1210 and hole 2 1212 to generate the output image 1218.

Method 2300 may include one or more additional operations. One or more of the operations of method 2300 may be optional. One or more of the operations of method 2300 may be performed in a different order.

Machine Architecture

Figure 24:
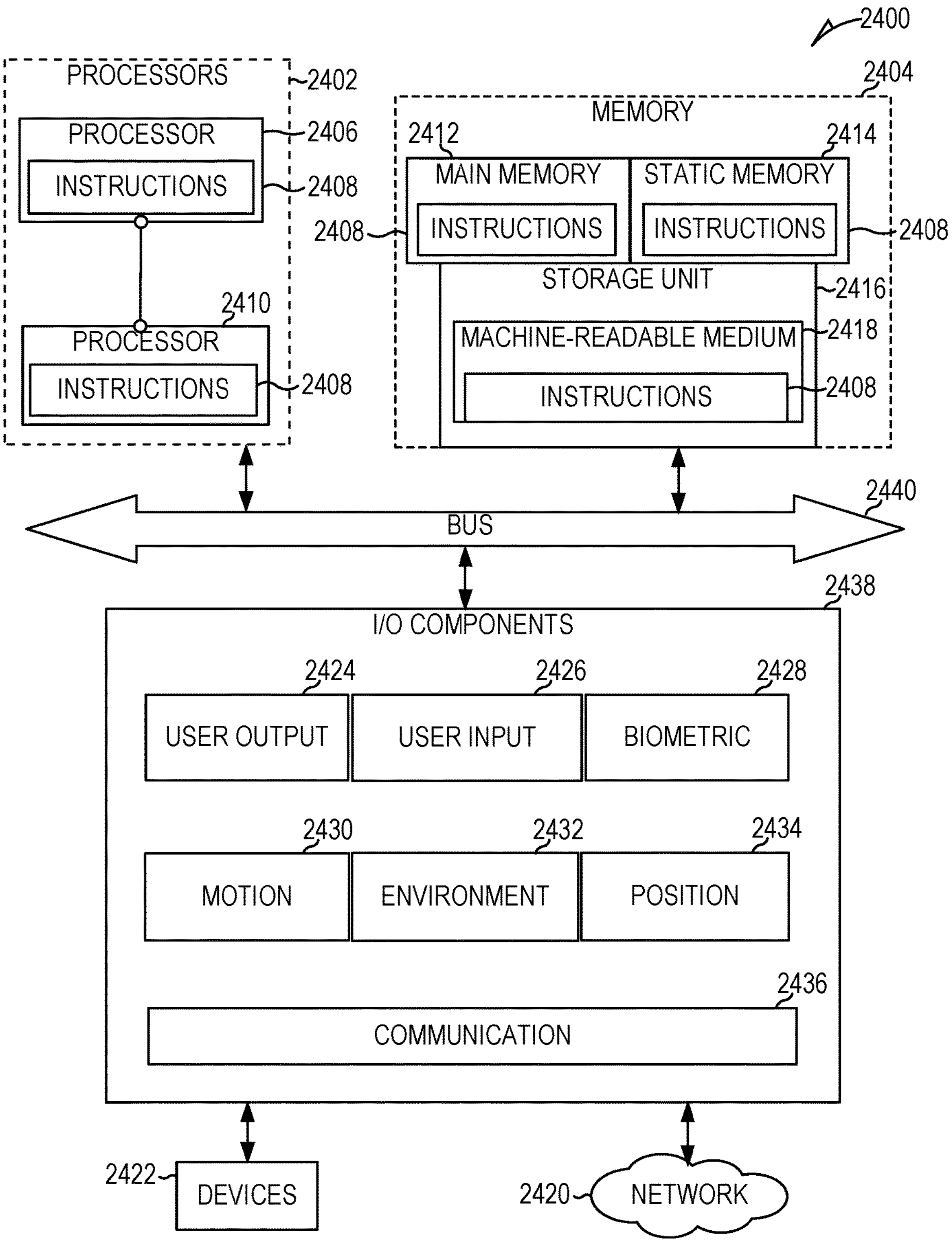
FIG. 24 is a diagrammatic representation of a machine in the form of a computer system within which a set of instructions may be executed for causing the machine to perform any one or more of the methodologies discussed herein, in accordance with some examples.

FIG. 24 is a diagrammatic representation of the machine 2400 within which instructions 2408 (e.g., software, a program, an application, an applet, an app, or other executable code) for causing the machine 2400 to perform any one or more of the methodologies discussed herein may be executed. For example, the instructions 2408 may cause the machine 2400 to execute any one or more of the methods described herein. The instructions 2408 transform the general, non-programmed machine 2400 into a particular machine 2400 programmed to carry out the described and illustrated functions in the manner described. The machine 2400 may operate as a standalone device or may be coupled (e.g., networked) to other machines. In a networked deployment, the machine 2400 may operate in the capacity of a server machine or a client machine in a server-client network environment, or as a peer machine in a peer-to-peer (or distributed) network environment. The machine 2400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2408, sequentially or otherwise, that specify actions to be taken by the machine 2400. Further, while only a single machine 2400 is illustrated, the term "machine" shall also be taken to include a collection of machines that individually or jointly execute the instructions 2408 to perform any one or more of the methodologies discussed herein. The machine 2400, for example, may comprise the client device 102 or any one of a number of server devices forming part of the messaging server system 108. In some examples, the machine 2400 may also comprise both client and server systems, with certain operations of a particular method or algorithm being performed on the server-side and with certain operations of the particular method or algorithm being performed on the client-side.

The machine 2400 may include processors 2402, memory 2404, and input/output I/O components 2438, which may be configured to communicate with each other via a bus 2440. The processors 2402 may be termed computer processors, in accordance with some embodiments. In an example, the processors 2402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2406 and a processor 2410 that execute the instructions 2408. The term "processor" is intended to include multi-core processors that may comprise two or more independent processors (sometimes referred to as "cores") that may execute instructions contemporaneously. Although FIG. 24 shows multiple processors 2402, the machine 2400 may include a single processor with a single-core, a single processor with multiple cores (e.g., a multi-core processor), multiple processors with a single core, multiple processors with multiples cores, or any combination thereof.

The memory 2404 includes a main memory 2412, a static memory 2414, and a storage unit 2416, both accessible to the processors 2402 via the bus 2440. The main memory 2404, the static memory 2414, and storage unit 2416 store the instructions 2408 embodying any one or more of the methodologies or functions described herein. The instructions 2408 may also reside, completely or partially, within the main memory 2412, within the static memory 2414, within machine-readable medium 2418 within the storage unit 2416, within at least one of the processors 2402 (e.g., within the Processor's cache memory), or any suitable combination thereof, during execution thereof by the machine 2400.

The I/O components 2438 may include a wide variety of components to receive input, provide output, produce output, transmit information, exchange information, capture measurements, and so on. The specific I/O components 2438 that are included in a particular machine will depend on the type of machine. For example, portable machines such as mobile phones may include a touch input device or other such input mechanisms, while a headless server machine will likely not include such a touch input device. It will be appreciated that the I/O components 2438 may include many other components that are not shown in FIG. 24. In various examples, the I/O components 2438 may include user output components 2424 and user input components 2426. The user output components 2424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2438 may include biometric components 2428, motion components 2430, environmental components 2432, or position components 2434, among a wide array of other components. For example, the biometric components 2428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2430 include acceleration sensor components (e.g., accelerometer), gravitation sensor components, rotation sensor components (e.g., gyroscope).

The environmental components 2432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 2434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2438 further include communication components 2436 operable to couple the machine 2400 to a network 2420 or devices 2422 via respective coupling or connections. For example, the communication components 2436 may include a network interface Component or another suitable device to interface with the network 2420. In further examples, the communication components 2436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2422 may be another machine or any of a wide variety of peripheral devices (e.g., a peripheral device coupled via a USB).

Moreover, the communication components 2436 may detect identifiers or include components operable to detect identifiers. For example, the communication components 2436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF425, Ultra Code, UCC RSS-2D bar code, and other optical codes), or acoustic detection components (e.g., microphones to identify tagged audio signals). In addition, a variety of information may be derived via the communication components 2436, such as location via Internet Protocol (IP) geolocation, location via Wi-Fi® signal triangulation, location via detecting an NFC beacon signal that may indicate a particular location, and so forth.

The various memories (e.g., main memory 2412, static memory 2414, and memory of the processors 2402) and storage unit 2416 may store one or more sets of instructions and data structures (e.g., software) embodying or used by any one or more of the methodologies or functions described herein. These instructions (e.g., the instructions 2408), when executed by processors 2402, cause various operations to implement the disclosed examples.

The instructions 2408 may be transmitted or received over the network 2420, using a transmission medium, via a network interface device (e.g., a network interface component included in the communication components 2436) and using any one of several well-known transfer protocols (e.g., hypertext transfer protocol (HTTP)). Similarly, the instructions 2408 may be transmitted or received using a transmission medium via a coupling (e.g., a peer-to-peer coupling) to the devices 2422.

Software Architecture

Figure 25:
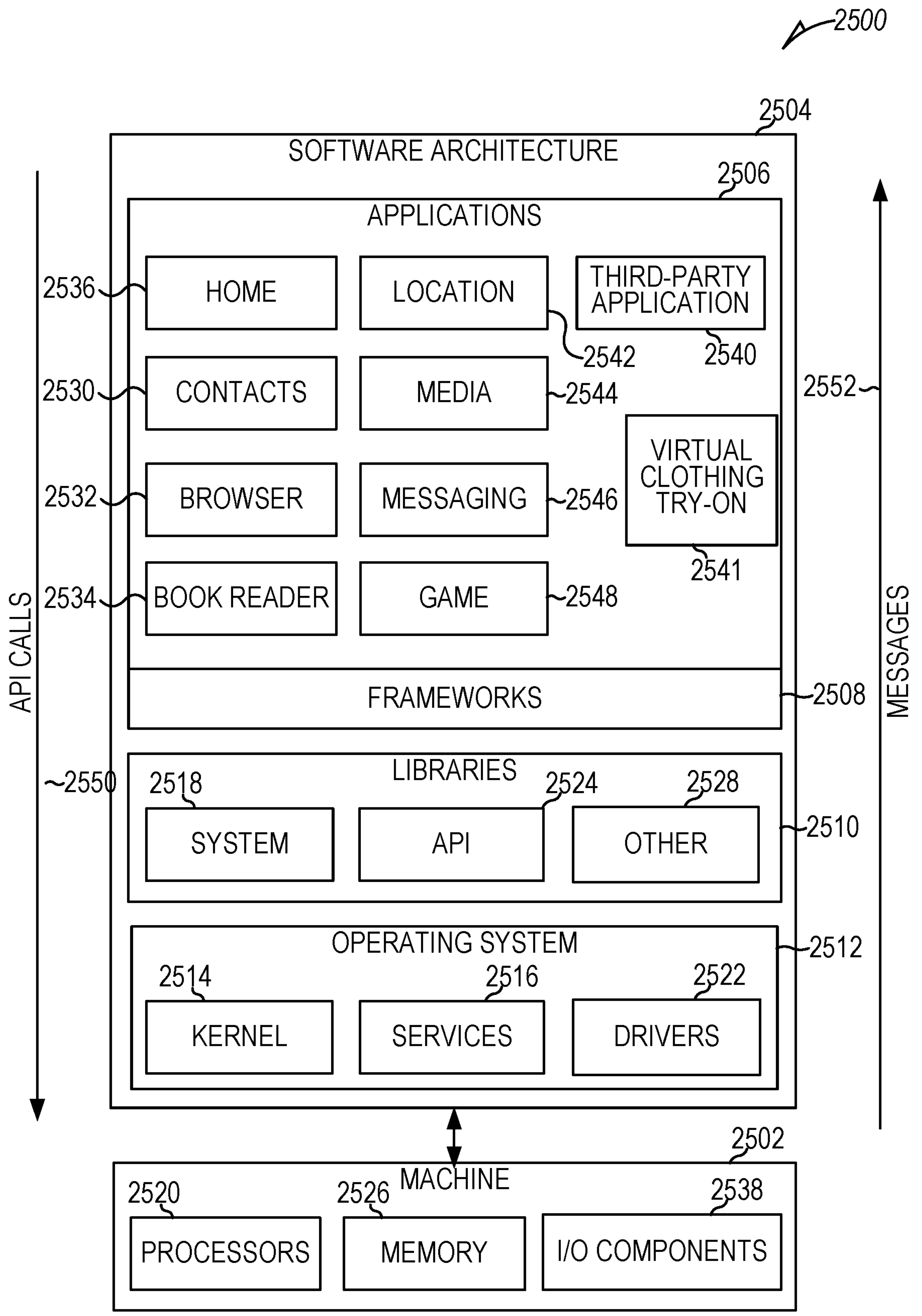
FIG. 25 is a block diagram showing a software architecture within which examples may be implemented.

FIG. 25 is a block diagram 2500 illustrating a software architecture 2504, which can be installed on any one or more of the devices described herein. The software architecture 2504 is supported by hardware such as a machine 2502 that includes processors 2520, memory 2526, and I/O components 2538. In this example, the software architecture 2504 can be conceptualized as a stack of layers, where each layer provides a particular functionality. The software architecture 2504 includes layers such as an operating system 2512, libraries 2510, frameworks 2508, and applications 2506.

Operationally, the applications 2506 invoke API calls 2550 through the software stack and receive messages 2552 in response to the API calls 2550.

The operating system 2512 manages hardware resources and provides common services. The operating system 2512 includes, for example, a kernel 2514, services 2516, and drivers 2522. The kernel 2514 acts as an abstraction layer between the hardware and the other software layers. For example, the kernel 2514 provides memory management, processor management (e.g., scheduling), component management, networking, and security settings, among other functionality. The services 2516 can provide other common services for the other software layers. The drivers 2522 are responsible for controlling or interfacing with the underlying hardware. For instance, the drivers 2522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2510 provide a common low-level infrastructure used by the applications 2506. The libraries 2510 can include system libraries 2518 (e.g., C standard library) that provide functions such as memory allocation functions, string manipulation functions, mathematic functions, and the like. In addition, the libraries 2510 can include API libraries 2524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2510 can also include a wide variety of other libraries 2528 to provide many other APIs to the applications 2506.

The frameworks 2508 provide a common high-level infrastructure that is used by the applications 2506. For example, the frameworks 2508 provide various graphical user interface (GUI) functions, high-level resource management, and high-level location services. The frameworks 2508 can provide a broad spectrum of other APIs that can be used by the applications 2506, some of which may be specific to a particular operating system or platform.

In an example, the applications 2506 may include a home application 2536, a contacts application 2530, a browser application 2532, a book reader application 2534, a virtual clothing try-on 2541 application, a location application 2542, a media application 2544, a messaging application 2546, a game application 2548, and a broad assortment of other applications such as a third-party application 2540. The virtual clothing try-on 2541 application may perform the operations as disclosed in conjunction with FIG. 9 and herein. The applications 2506 are programs that execute functions defined in the programs. Various programming languages can be employed to create one or more of the applications 2506, structured in a variety of manners, such as object-oriented programming languages (e.g., Objective-C, Java, or C++) or procedural programming languages (e.g., C or assembly language). In a specific example, the third-party application 2540 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 2540 can invoke the API calls 2550 provided by the operating system 2512 to facilitate functionality described herein.

Processing Components

Figure 26:
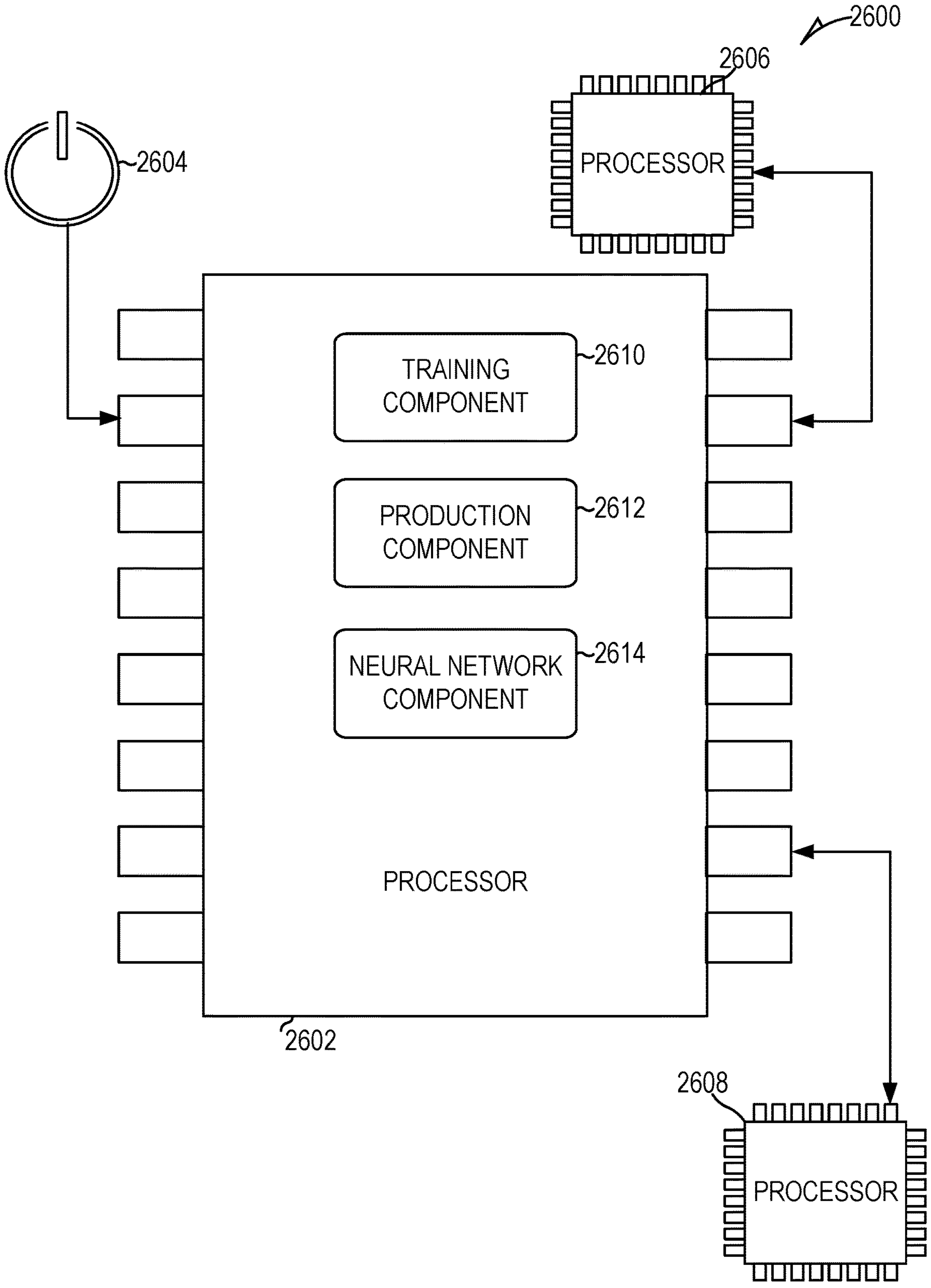
FIG. 26 is a diagrammatic representation of a processing environment, in accordance with some examples.

Turning now to FIG. 26, there is shown a diagrammatic representation of a processing environment 2600, which includes a processor 2602, a processor 2606, and a processor 2608 (e.g., a GPU, CPU or combination thereof). The processor 2602 is shown to be coupled to a power source 2604, and to include (either permanently configured or temporarily instantiated) modules, namely a training component 2610, a production component 2612, and a neural network component 2614. Referring to FIG. 22, the training component 2610 operationally trains neural network 2204; the production component 2612 operationally performs the operations for the neural network 2210 and user interface functions; and, the neural network component 2614 operationally assists in performing operations for training and production of the neural network 2204. As illustrated, the processor 2602 is communicatively coupled to both the processor 2606 and the processor 2608.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1602 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computing device comprising:

one or more processors; and one or more memories storing instructions that, when executed by the one or more processors, configure the one or more processors to perform operations comprising:

accessing a target garment image and a person image of a person wearing a source garment;

processing the person image to generate a source garment image;

processing the source garment image to generate a warping;

processing the target garment image in accordance with the warping to generate a warped target garment image of a warped target garment;

determining an area of the person image to place the warped target garment image based on a source garment mask;

processing the area of the person image with the warped target garment image to generate an output image of the person wearing the warped target garment;

generating a source garment mask from the source garment image;

generating a warped target garment mask; and subtracting the warped target garment mask from the source garment mask to determine holes indicating areas of the source garment mask not covered by the warped target garment mask.

2. The computing device of claim 1, wherein the processing the source garment image to generate the warping further comprises:

extracting first features of the target garment image; and extracting second features of the source garment image.

3. The computing device of claim 2, wherein the extracting first features comprises:

inputting the target garment image into a convolutional neural network (CNN) to generate first features.

4. The computing device of claim 2, wherein the operations further comprise:

matching the first features and the second features to generate a correlation map.

5. The computing device of claim 4, wherein the operations further comprise:

determining thin-plate spline (TPS) transformation parameters based on the correlation map, wherein the warping is the TPS transformation parameters.

6. The computing device of claim 5, wherein the determining further comprises:

inputting the correlation map into a convolutional neural network (CNN) to generate a warp grid, wherein the warp grid is the warping.

7. The computing device of claim 1, wherein the operations further comprise:

processing the output image to fill in the holes.

8. The computing device of claim 7, wherein the holes are filled in with a texture of the target garment.

9. The computing device of claim 1, wherein the operations further comprise:

processing the output image to adjust a lighting of the output image in accordance with lighting of the source garment.

10. A non-transitory computer-readable storage medium including instructions that, when processed by a computer, configure the computer to perform operations comprising:

accessing a target garment image and a person image of a person wearing a source garment;

processing the person image to generate a source garment image;

processing the source garment image to generate a warping;

processing the target garment image in accordance with the warping to generate a warped target garment image of a warped target garment;

determining an area of the person image to place the warped target garment image based on a source garment mask;

processing the area of the person image with the warped target garment image to generate an output image of the person wearing the warped target garment;

generating a source garment mask from the source garment image;

generating a warped target garment mask; and subtracting the warped target garment mask from the source garment mask to determine holes indicating areas of the source garment mask not covered by the warped target garment mask.

11. The non-transitory computer-readable storage medium of claim 10, wherein the processing the source garment image to generate the warping further comprises:

extracting first features of the target garment image; and extracting second features of the source garment image.

12. The non-transitory computer-readable storage medium of claim 11, wherein the extracting first features comprises:

inputting the target garment image into a convolutional neural network (CNN) to generate first features.

13. The non-transitory computer-readable storage medium of claim 11, wherein the operations further comprise:

matching the first features and the second features to generate a correlation map.

14. The non-transitory computer-readable storage medium of claim 13, wherein the operations further comprise:

determining thin-plate spline (TPS) transformation parameters based on the correlation map, wherein the warping is the TPS transformation parameters.

15. The non-transitory computer-readable storage medium of claim 10, wherein the operations further comprise:

processing the output image to fill in the holes.

16. A method comprising:

accessing a target garment image and a person image of a person wearing a source garment;

processing the person image to generate a source garment image;

processing the source garment image to generate a warping;

processing the target garment image in accordance with the warping to generate a warped target garment image of a warped target garment;

determining an area of the person image to place the warped target garment image based on a source garment mask;

processing the area of the person image with the warped target garment image to generate an output image of the person wearing the warped target garment;

generating a source garment mask from the source garment image;

generating a warped target garment mask; and subtracting the warped target garment mask from the source garment mask to determine holes indicating areas of the source garment mask not covered by the warped target garment mask.

17. The method of claim 16, wherein the processing the source garment image to generate the warping further comprises:

extracting first features of the target garment image; and extracting second features of the source garment image.

18. The method of claim 17, wherein the extracting first features comprises:

inputting the target garment image into a convolutional neural network (CNN) to generate first features.

19. The method of claim 17, wherein the method further comprises:

matching the first features and the second features to generate a correlation map.

20. The method of claim 16, wherein the operations further comprise:

processing the output image to fill in the holes.

* * * * *